US010679616B2

United States Patent
Stanley et al.

(10) Patent No.: US 10,679,616 B2
(45) Date of Patent: Jun. 9, 2020

(54) GENERATING ACOUSTIC MODELS OF ALTERNATIVE PRONUNCIATIONS FOR UTTERANCES SPOKEN BY A LANGUAGE LEARNER IN A NON-NATIVE LANGUAGE

(71) Applicant: ROSETTA STONE LTD., Harrisonburg, VA (US)

(72) Inventors: Theban Stanley, Boulder, CO (US); Kadri Hacioglu, Boulder, CO (US); Vesa Siivola, Espoo (FI)

(73) Assignee: ROSETTA STONE LTD., Harrisonburg, VA (US)

( * ) Notice: Subject to any disclaimer, the term of this patent is extended or adjusted under 35 U.S.C. 154(b) by 0 days.

(21) Appl. No.: 16/023,303

(22) Filed: Jun. 29, 2018

(65) Prior Publication Data
US 2018/0308474 A1    Oct. 25, 2018

Related U.S. Application Data

(63) Continuation of application No. 13/932,506, filed on Jul. 1, 2013, now Pat. No. 10,068,569.
(Continued)

(51) Int. Cl.
G10L 15/187       (2013.01)
G09B 19/06        (2006.01)
(Continued)

(52) U.S. Cl.
CPC .............. *G10L 15/19* (2013.01); *G09B 19/06* (2013.01); *G10L 15/187* (2013.01)

(58) Field of Classification Search
CPC .................. G10L 15/06; G10L 15/063; G10L 2015/0636; G10L 15/187; G06F 17/274;
(Continued)

(56) References Cited

U.S. PATENT DOCUMENTS 5,634,086 A    5/1997   Rtischev et al.
6,076,053 A    6/2000   Juang et al.
(Continued)

FOREIGN PATENT DOCUMENTS

WO    2013003749    1/2013
WO    2014005142    1/2014

OTHER PUBLICATIONS

Office Action for U.S. Appl. No. 14/141,774, dated Nov. 18, 2014, 11 pages.
(Continued)

*Primary Examiner* — Martin Lerner
(74) *Attorney, Agent, or Firm* — Baker & McKenzie

(57) ABSTRACT

A non-transitory processor-readable medium storing code representing instructions to be executed by a processor includes code to cause the processor to receive acoustic data representing an utterance spoken by a language learner in a non-native language in response to prompting the language learner to recite a word in the non-native language and receive a pronunciation lexicon of the word in the non-native language. The pronunciation lexicon includes at least one alternative pronunciation of the word based on a pronunciation lexicon of a native language of the language learner. The code causes the processor to generate an acoustic model of the at least one alternative pronunciation in the non-native language and identify a mispronunciation of the word in the utterance based on a comparison of the acoustic data with the acoustic model. The code causes the processor to send feedback related to the mispronunciation of the word to the language learner.

26 Claims, 10 Drawing Sheets

Related U.S. Application Data

(60) Provisional application No. 61/666,342, filed on Jun. 29, 2012.

(51) Int. Cl.
 *G10L 15/19* (2013.01)
 *G06F 40/58* (2020.01)
 *G09B 19/04* (2006.01)

(58) Field of Classification Search
 CPC .. G06F 17/28; G06F 17/2836; G06F 17/2854; G06F 40/40; G06F 40/47; G06F 40/51; G06F 40/58; G09B 19/04; G09B 19/06
 USPC .......... 704/2, 8, 10, 231, 270, 277; 434/157, 434/185
 See application file for complete search history.

(56) References Cited

U.S. PATENT DOCUMENTS

| | | | |
|---|---|---|---|
| 6,078,885 A | 6/2000 | Beutnagel | |
| 6,963,841 B2 | 11/2005 | Handal et al. | |
| 7,149,690 B2 | 12/2006 | August et al. | |
| 7,270,546 B1 | 9/2007 | Adams, Jr. et al. | |
| 7,310,600 B1 | 12/2007 | Garner et al. | |
| 7,467,087 B1 | 12/2008 | Gillick et al. | |
| 7,778,834 B2 | 8/2010 | Higgins et al. | |
| 7,840,404 B2 | 11/2010 | Xi et al. | |
| 8,175,882 B2 | 5/2012 | Basson et al. | |
| 10,068,569 B2 * | 9/2018 | Stanley | G10L 15/19 |
| 2004/0176960 A1 | 9/2004 | Shpiro et al. | |
| 2004/0186732 A1 | 9/2004 | Okura et al. | |
| 2005/0143970 A1 | 6/2005 | Roth et al. | |
| 2006/0074656 A1 | 4/2006 | Mathias et al. | |
| 2007/0112569 A1 | 5/2007 | Wang et al. | |
| 2007/0255567 A1 | 11/2007 | Bangalore et al. | |
| 2007/0271241 A1 | 11/2007 | Morris et al. | |
| 2008/0096170 A1 | 4/2008 | Raya et al. | |
| 2009/0004633 A1 | 1/2009 | Johnson et al. | |
| 2009/0192781 A1 * | 7/2009 | Bangalore | G06F 40/45 704/2 |
| 2009/0248394 A1 | 10/2009 | Sarikaya et al. | |
| 2010/0145698 A1 | 6/2010 | Chen et al. | |
| 2010/0304342 A1 | 12/2010 | Zilber | |
| 2010/0312560 A1 | 12/2010 | Ljolje et al. | |
| 2011/0022381 A1 * | 1/2011 | Gao | G06F 40/44 704/7 |
| 2012/0041764 A1 | 2/2012 | Xu et al. | |
| 2012/0065977 A1 * | 3/2012 | Tepperman | G10L 13/08 704/258 |
| 2012/0078630 A1 | 3/2012 | Hagen et al. | |
| 2012/0214141 A1 | 8/2012 | Raya et al. | |
| 2014/0032216 A1 | 1/2014 | Roth et al. | |
| 2014/0095143 A1 | 4/2014 | Jan et al. | |
| 2014/0205974 A1 | 7/2014 | Pellom et al. | |
| 2014/0278421 A1 | 9/2014 | Komissarchik et al. | |

OTHER PUBLICATIONS

Final Office Action for U.S. Appl. No. 14/141,774, dated Sep. 1, 2015, 6 pages.

International Search Report and Written Opinion for International Application No. PCT/US2012/044992, dated Oct. 17, 2012, 11 pages.

International Search Report and Written Opinion for International Application No. PCT/US2013/048935, dated Jan. 22, 2014, 10 pages.

Bangs, J. S., "Lingua: Phonology: Segment—a module to represent a segment as a bundle of feature values," [online] Retrieved from the Internet <URL:https://web.archive.org/web/20100301042732/http://search.cpan.org/~jaspax/Lingua-Phonology-0.33/Phonology/Segment.pm>, (Mar. 1, 2010), 8 pages.

Federico, M. et al., "IRSTLM: an Open Source Toolkit for Handling Large Scale Language Models," [online] Retrieved from the Internet <URL:https://hermessvn.fbk.eu/svn/hermes/open/federico/papers/interspeech08-federico.pdf>, Proceedings of Interspeech, Brisbane, Australia (2008), 4 pages.

Franco, H. et al., "The SRI EduSpeak System: Recognition and Pronunciation Scoring for Language Learning," [online] Retrieved from the Internet <URL:http://www.cs.columbia.edu/~amaxwell/candidacy/12learning/EduSpeak.pdf>, Proc. of InSTIL, Scotland, 123-128 (2000), 6 pages.

Harrison, A. M., et al., "Improving Mispronunciation Detection and Diagnosis of Learners' Speech with Context-sensitive Phonological Rules based on Language Transfer," [online] Retrieved from the Internet <URL: http://www.iscaspeech.org/archive/archive_papers/interspeech_2008/i08_2787.pdf> Interspeech, Brisbane, Australia, pp. 2787-2790 (Sep. 22-26, 2008).

Koehn, P. et al., "Moses: Open Source Toolkit for Statistical Machine Translation," [online] Retrieved from the Internet <URL:https://www.cs.jhu.edu/~ccb/publications/moses-toolkit.pdf>, Annual Meeting of the Association for Computational Linguistics (ACL), Demonstration and Poster Sessions, Prague, Czech Republic (Jun. 2007), pp. 177-180.

Koehn, P., "Pharaoh: A Beam Search Decoder for Phrase-Based Statistical Machine Translation Models," [online] Retrieved from the Internet <URL: http://homepages.inf.ed.ac.uk/pkoehn/publications/pharaoh-amta2004.pdf>, AMTA (2004), 10 pages.

Lo, W. K. et al., "Automatic Derivation of Phonological Rules for Mispronunciation Detection in a Computer-Assisted Pronunciation Training System", [online] Retrieved from the Internet <URL:http://citeseerx.ist.psu.edu/viewdoc/download?doi=10.1.1.309.1379&rep=rep1&type=pdf> Proc. Interspeech, Makuhari, Japan, pp. 765-768 (2010).

Meng, H. et al., "Deriving Salient Learners' Mispronunciations from Cross-Language Phonological Comparisons," [online] Retrieved from the Internet <URL:http://www 1.se.cuhk.edu.hk/~hccl/publications/pub/Meng-ASRU2007.5.pdf>, Published in Automatic Speech Recognition & Understanding, ASRU. IEEE Workshop, (Dec. 9-13, 2007), pp. 437-442.

Och, F. J. et al., "A Systematic Comparison of Various Statistical Alignment Models," [online] Retrieved from the Internet: <URL:http://citeseerx.ist.psu.edu/viewdoc/download?doi=10.1.1.10.1288&rep=rep 1&type=pdf>, Computational Linguistics, 29(1): 19-51 (Mar. 2003).

Povey, D., "Discriminative Training for Large Vocabulary Speech Recognition," Ph.D. Dissertation, Dept. Eng., Univ. Cambridge, Cambridge, UK (2003), 170 pages.

Siivola, V. et al., "Modeling word errors of language learners," Rosetta Stone Labs, Boulder, Colorado (2012), 4 pages.

Stanley, T. et al., "Statistical Machine Translation Framework for Modeling Phonological Errors in Computer Assisted Pronunciation Training System," [online] Retrieved from the Internet: <URL:http://project.cgm.unive.it/events/SLaTE2011/papers/Stanley--mt_for_phonological_error_modeling.pdf> [retrieved on Oct. 9, 2012], Proc. of SLaTE, Venice, Italy pp. 125-128 (2011).

Weide, R. L., '7 The CMU pronunciation dictionary (version 0.7a) [Online}. Carnegie-Mellon University (2010). Available: http://www.speech.cs.cmu.edu/egi-bin/emudict.

Witt, S.M. et al., "Phone-level pronunciation scoring and assessment for interactive language learning," Speech Communication, 30(2-3):95-108 (2000).

Young, S. J. et al., The HTK Book (vers. 3.4) [Online]. Cambridge Research Laboratory (2006). Available: http://htk.eng.cam.ac.uk/prot~does/htk_book.shtml.

Swan, et al., "Learner English: A teacher's guide to interference and other problems," 2nd ed., vol. 1. Cambridge, UK: Cambridge Univ. Press, 2001.

Raux, et al., "Using task-oriented spoken dialogue systems for language learning: Potential practical application and challenges," in Proc. in InSTIL/ICALL'04, 2004, Venice, Italy, paper 035.

Mote, et al., "Tactical language detection and modeling of learner speech errors," in Proc. of InSTIL/ICALL '04, 2004, Venice, Italy, paper 012.

(56) References Cited

OTHER PUBLICATIONS

Kweon, et al., "A grammatical error detection method for dialog-based CALL system," in Journal of Natural Language Processing, 12(4), 2005, pp. 137-156.
Wang, et al., "Effective error prediction using decision tree for ASR grammar network in CALL system," in Proc. of ICASSP, 2008, Las Vegas, NV, pp. 5069-5072.
Strik, et al., "Improving ASR processing of ungrammatical utterances through grammatical error modeling," in Proc. of SLaTE'11, 2011, Venice, Italy, pp. 109-112.
Witt, et al., "Computer-assisted pronunciation teaching based on automatic speech recognition," in Language Teaching and Language Technology, 1997, pp. 25-35.
Izumi et al., "The NICT JLE Corpus exploiting the language learners speech database for research and education," in International Journal of the Computer, the Internet and Management, 12(2), 2004, pp. 119-125.

\* cited by examiner

590

```
┌─────────────────────────────────────────────────┐
│ Receive a phrase having a set of words from a   │
│ language learning module in response to the     │
│ language learning module prompting a            │
│ language learner to recite the phrase in a      │
│ non-native language                              │
│ 591                                              │
└─────────────────────────────────────────────────┘
                       ▼
┌─────────────────────────────────────────────────┐
│ Generate a non-native lexicon including a set   │
│ of alternative phrases having a probability     │
│ greater than a threshold level of being spoken  │
│ by the language learner when the language       │
│ learner attempts to recite the phrase in the    │
│ non-native language                              │
│ 592                                              │
└─────────────────────────────────────────────────┘
                       ▼
┌─────────────────────────────────────────────────┐
│ Generate an acoustic model for each alternative │
│ phrase from the set of alternative phrases      │
│ based on phonetically annotated data associated │
│ with a recitation of each word from the set of  │
│ words in the phrase                              │
│ 593                                              │
└─────────────────────────────────────────────────┘
                       ▼
┌─────────────────────────────────────────────────┐
│ Identify that the language learner recited an   │
│ alternative phrase from the set of alternative  │
│ phrases based on a comparison of the acoustic   │
│ model for that alternative phrase and acoustic  │
│ data representing an utterance spoken by the    │
│ language learner in response to the language    │
│ learning module prompting the language learner  │
│ to recite the phrase in the non-native language │
│ 594                                              │
└─────────────────────────────────────────────────┘
                       ▼
┌─────────────────────────────────────────────────┐
│ Identify at least one word from the set of      │
│ words in the phrase that was incorrectly        │
│ recited by the language learner to produce the  │
│ alternative phrase                               │
│ 595                                              │
└─────────────────────────────────────────────────┘
                       ▼
┌─────────────────────────────────────────────────┐
│ Send feedback to the language learner           │
│ associated with the at least one word           │
│ 596                                              │
└─────────────────────────────────────────────────┘
```

FIG. 12

GENERATING ACOUSTIC MODELS OF ALTERNATIVE PRONUNCIATIONS FOR UTTERANCES SPOKEN BY A LANGUAGE LEARNER IN A NON-NATIVE LANGUAGE

CROSS-REFERENCE TO RELATED APPLICATIONS

This application is a Continuation of U.S. patent application Ser. No. 13/392,506, entitled "Generating Acoustic Models Of Alternative Pronunciations For Utterances Spoken By A Language Learner In A Non-Native Language," filed Jul. 1, 2013, now U.S. Pat. No. 10,068,569 issued on Sep. 4, 2018, which claims priority to and the benefit of U.S. Provisional Application Ser. No. 61/666,342, entitled "L1-Specific Phonological Error Diagnosis in Computer-Assisted Pronunciation Training and Modeling Word Errors of Language Learners," filed on Jun. 29, 2012, each of which is incorporated herein by reference in their entirety.

This application is related to PCT Patent Application Serial No. PCT/US2012/044992, entitled "Statistical Machine Translation Framework for Modeling Phonological Errors in Computer-Assisted Pronunciation Training System," filed Jun. 29, 2012, which claims priority to U.S. Provisional Application Ser. No. 61/503,325, filed Jun. 30, 2011; each of which is incorporated herein by reference in its entirety.

BACKGROUND

Embodiments described herein relate generally to language instruction. More particularly, embodiments described herein relate to a system and method for modeling of phonological errors in computer-assisted pronunciation training (CAPT) systems.

CAPT systems can be effective among language learners who prefer to go through a curriculum at their own pace. For example, CAPT systems can administer repeated practice drills which may be needed for a learner to achieve sufficient familiarity with a learned language. Some known CAPT systems are first language (L1) independent (i.e., the language learner's first language or "native" language) and cater to a wide audience of language learners from different language backgrounds. These systems guide the learner through predesigned prompts and provide limited feedback based on the closeness of the acoustics of the learners' pronunciation to that of native/canonical pronunciation. In some such systems, the corrective feedback, if any, is implicit in the form of pronunciation scores. Moreover, in some instances, such systems may include manual creation and learned patterns gained through regular expression. In such instances, the learner may need to self-correct based on his/her own intuition about what went wrong. This method can be ineffective especially when the learner suffers from the inability to perceive certain native sounds.

Accordingly, a need exists for systems and methods for modeling phonological errors based on native pronunciations.

SUMMARY

Systems and methods for modeling of phonological errors in CAPT systems are described herein. In some embodiments, a non-transitory processor-readable medium storing code represents instructions to be executed by a processor and includes code to cause the processor to receive acoustic data representing an utterance spoken by a language learner in a non-native language in response to prompting the language learner to recite a word in the non-native language. The code includes instructions to cause the processor to receive a pronunciation lexicon of the word in the non-native language. The pronunciation lexicon of the word includes at least one alternative pronunciation of the word determined, based on a pronunciation lexicon of a native language of the language learner. The code includes instructions to cause the processor to generate an acoustic model of the at least one alternative pronunciation of the word from the pronunciation lexicon of the word in the non-native language. The code includes instructions to cause the processor to identify a mispronunciation of the word in the utterance based on a comparison of the acoustic data with the acoustic model. The code includes instructions to cause the processor to send feedback related to the mispronunciation of the word to the language learner.

BRIEF DESCRIPTION OF THE DRAWINGS

FIG. 12 is a flowchart illustrating a method of using a CAPT system, according to another embodiment.

DETAILED DESCRIPTION

Figure 1:
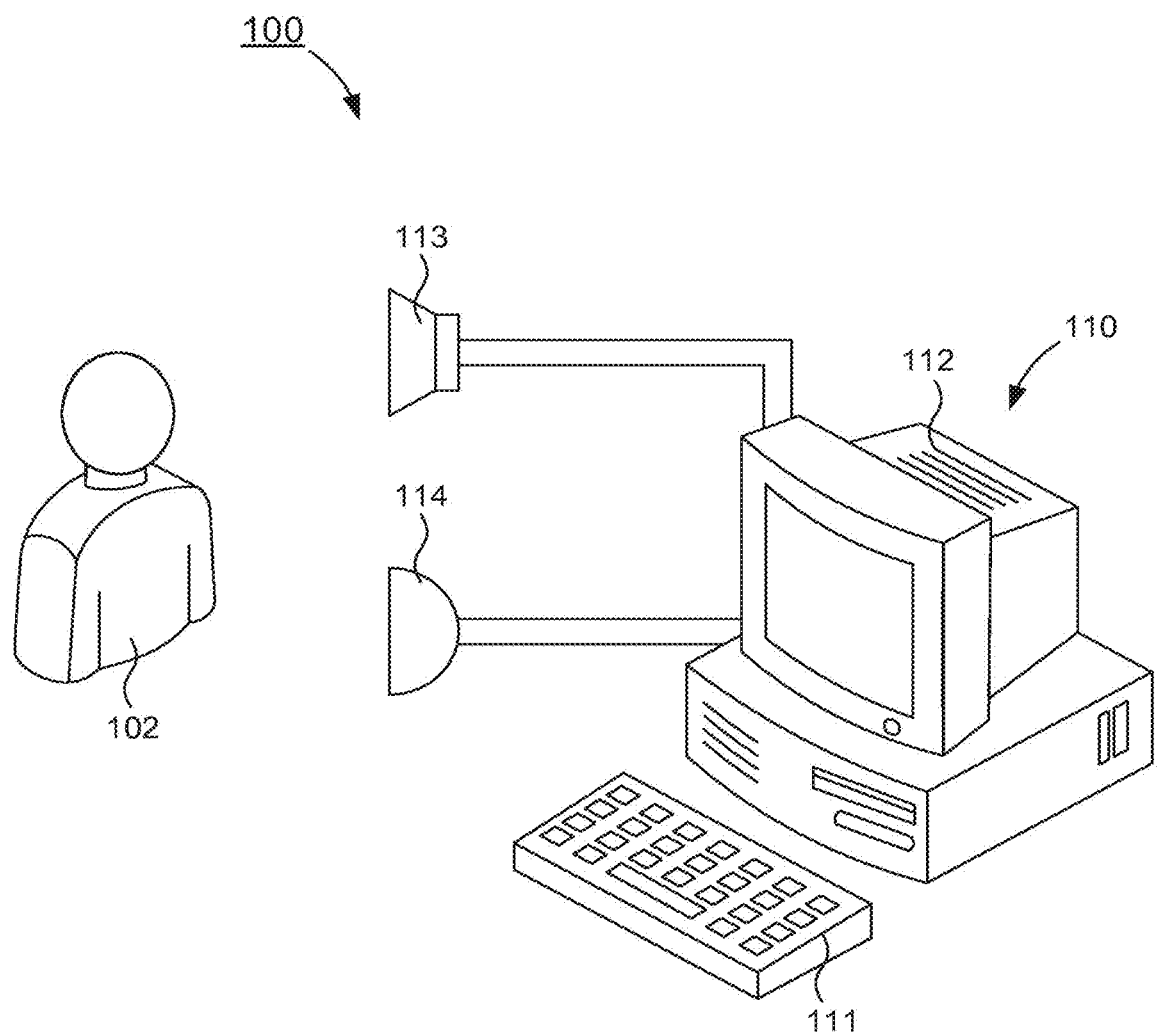
FIG. 1 is a schematic illustration of a CAPT system, according to an embodiment.

In some embodiments, a non-transitory processor-readable medium storing code representing instructions to be executed by a processor include code to cause the processor to receive acoustic data representing an utterance spoken by a language learner in a non-native language in response to prompting the language learner to recite a word in the non-native language. The code includes instructions to cause the processor to receive a pronunciation lexicon of the word in the non-native language. The pronunciation lexicon of the word includes at least one alternative pronunciation of the word determined, based on a pronunciation lexicon of a native language of the language learner. The code includes instructions to cause the processor to generate an acoustic model of the at least one alternative pronunciation of the word from the pronunciation lexicon of the word in the non-native language. The code includes instructions to cause the processor to identify a mispronunciation of the word in the utterance based on a comparison of the acoustic data with the acoustic model. The code includes instructions to cause the processor to send feedback related to the mispronunciation of the word to the language learner.

In some embodiments, a method includes receiving acoustic data representing an utterance spoken by a language learner in a non-native language in response to prompting the language learner to recite a word in the non-native language. The method includes generating an alternative pronunciation of the word based on a pronunciation lexicon of a native language of the language learner and phonetically annotated data associated with a native pronunciation of the word. An acoustic model for the alternative pronunciation of the word is generated. A mispronunciation of the word in the utterance is identified in response to a speech recognition engine recognizing the acoustic data as part of the acoustic model. The method includes sending feedback related to the mispronunciation of the word to the language learner in response to the identifying of the mispronunciation of the word in the utterance.

In some embodiments, a method includes receiving a phrase having a set of words from a language learning module in response to the language learning module prompting a language learner, having a native language, to recite the phrase in a non-native language. The method includes generating a non-native lexicon that includes a set of alternative phrases having a probability greater than a threshold level of being spoken by the language learner when the language learner attempts to recite the phrase in the non-native language. An acoustic model for each alternative phrase from the set of alternative phrases is generated. The acoustic model for each alternative phrase from the set of alternative phrases is based, at least partially, on phonetically annotated data associated with a native recitation of each word from the set of words in the phrase. The method includes identifying that the language learner recited an alternative phrase from the set of alternative phrases based on a comparison of the acoustic model for the alternative phrase and acoustic data representing an utterance spoken by the language learner in response to the language learning module prompting the language learner to recite the phrase in the non-native language. The method also includes sending feedback to the language learner associated with the at least one word.

In some embodiments, a memory is configured to store a machine translation module, an acoustic model module, and a recognition module. The machine translation module is configured to generate a model of a phonological error of a word spoken by a language learner in a non-native language. The acoustic model module is configured to generate an acoustic model of a pronunciation of the word spoken by the language learner based on the native language of the language learner. The acoustic model module is also configured to train the acoustic model using phonetically annotated data related to the native language and a lexicon of the non-native language. The recognition module is configured to generate feedback related to the pronunciation of the word to the language learner based on the model generated by the machine translation module, the model generated by the acoustic model module, and the native language of the language learner.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "native language" and "non-native language" refer to the first language L1 and the second language L2, respectively, of a language learner. That is to say, a language learner's native language or L1 is the language not being taught by a CAPT system and the language learner's non-native language or L2 is the language being taught by the CAPT system. Said another way, the non-native language is the language that the language learner is attempting to learn through the use of the CAPT system.

As will be discussed in more detail below, it is desirable for CAPT systems to capture language transfer effects between the learner's first language (L1) and second language (L2), which can make such CAPT systems better equipped to detect, identify, and provide actionable feedback to the learner. In some instances, if the system is able to successfully pinpoint errors, it can not only help the learner identify and self-correct a problem, but can also be used as input for a host of other applications including content recommendation systems and/or individualized curriculum-based systems. For example, if the learner consistently mispronounces a phoneme (the smallest sound unit in a language capable of conveying a distinct meaning), the learner can be recommended remedial perception exercises before continuing the speech production activities. Also, language tutors can receive regular error reports on learners, which can be useful in periodic tuning of customizable curriculum. Generally, the most common cause for mispronunciations arises from the fact that a target language (or non-native language) has phonetic units that are nonexistent in the learner's native language. As a result, the learner often replaces a target phonetic unit with the closest phonetic unit that exists in his/her L1 inventory (or native language inventory). Furthermore, deletion and insertion errors commonly occur due to phonotactic constraints that are projected from a learner's L1 language (commonly referred to as L1 negative transfer effect). The successful modeling of this effect is the key to providing accurate and actionable feedback to the learners.

FIG. 1 is a schematic illustration of a CAPT system 100, according to an embodiment. The CAPT system 100 can be used by and/or can interact with one or more users 102 such as, for example, a language learner(s), a student, a teacher, a translator, and/or the like. More specifically, the CAPT system 100 can be used by a user 102 to facilitate learning a non-native language. As shown in FIG. 1, in some embodiments, the CAPT system 100 can be stored and/or executed in, for example, a compute device 110. For example, in some embodiments, the CAPT system 100 can be stored in or on a memory (e.g., a compact disc (CD), a hard drive, a server, and/or the like), and installed on the compute device 110. In some embodiments, the CAPT system 100 can be, for example, stored on a network attached storage device that can be coupled to or included in a server, a host device, and/or any other network attached device such that the compute device 110 can download the CAPT system 100 onto, for example, a memory of the compute device 110. In other embodiments, the CAPT system 100 can be executed on, for example, a server and represented on or at the compute device 110 (e.g., via an application, an Internet web browser, etc.).

The compute device 110 can be any suitable electronic device such as, for example, a desktop personal computer (PC), a laptop, a tablet, a smart phone, a personal digital assistant, a gaming console, and/or the like. The compute device 110 can include a user input device 111 (e.g., a keyboard (as shown), a mouse (not shown), and/or the like), a display 112 (e.g., a liquid crystal display (LCD), a cathode ray tube (CRT), a light emitting diode (LED) screen, and/or the like), one or more speakers 113, and one or more microphones 114. In some embodiments, the display 112 can be a touch screen, or the like, that the user 102 can touch and/or otherwise interact with (e.g., interact with directly by touching the touch screen or indirectly by placing a stylus, or the like, in contact with the touch screen). In this manner, the user 102 can manipulate the compute device 110 to perform one or more tasks, functions, processes, etc. associated with using the CAPT system 100.

Figure 2:
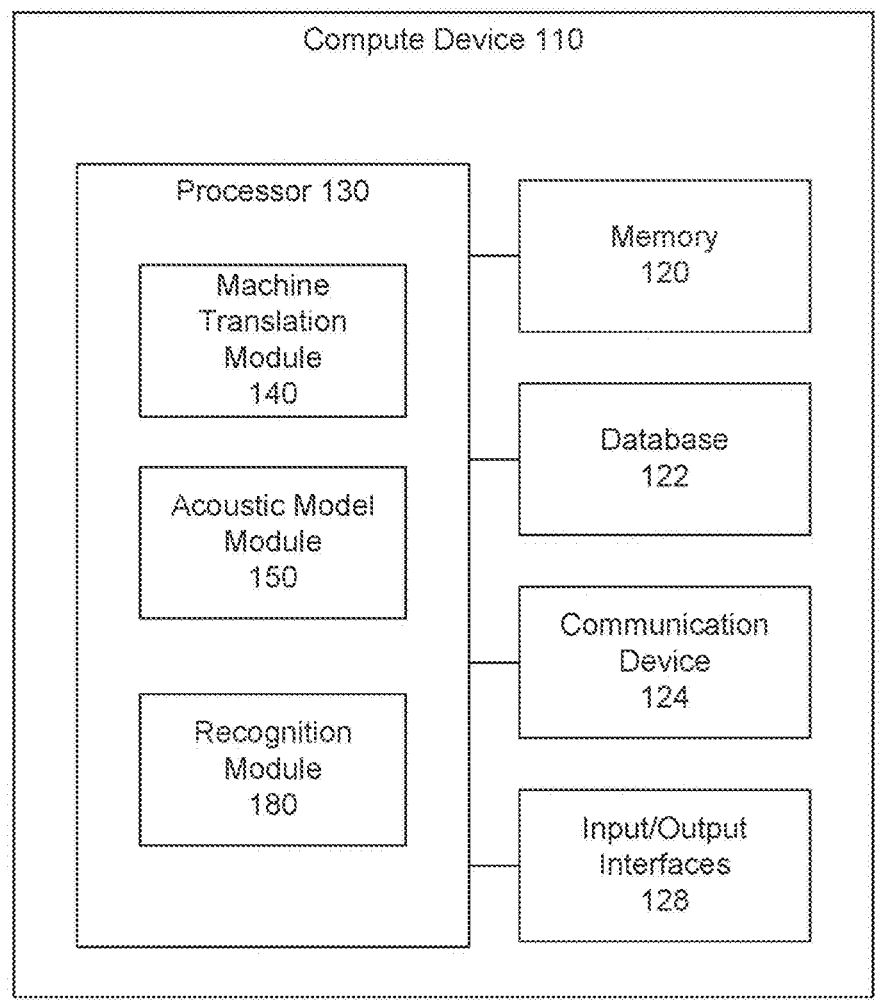
FIG. 2 is a block diagram of a compute device including the CAPT system of FIG. 1.

As shown in FIG. 2, the compute device 110 further includes a memory 120, a database 122, a communication device 124, one or more input/output (I/O) interfaces 128, and a processor 130. The memory 120 can be, for example, a random access memory (RAM), a memory buffer, a hard drive, a read-only memory (ROM), an erasable programmable read-only memory (EPROM), and/or the like. In some embodiments, the memory 120 can be configured to store, for example, one or more modules that can include instructions that can cause the processor 130 to perform one or more processes, functions, and/or the like, as described in further detail herein. The database 122 can be, for example, a table, a repository, a relational database, an object-oriented database, an object-relational database, a structured query language (SQL) database, an extensible markup language (XML) database, and/or the like. In some embodiments, the database 122 can be configured to store data such as, for example, user data and/or preferences, system data, one or more language lexicons, language models, translational models, training models, and/or the like. In some embodiments, the database 122 can be stored, for example, in the memory 120. In other embodiments, a database can be independent of the memory 120 (e.g., a secondary hard drive, an external hard drive, a network attached storage device (NAS), and/or the like).

The communication device 124 can be any suitable device that can communicate with a network. Moreover, the communication device 124 can include one or more wired and/or wireless interfaces, such as, for example, Ethernet interfaces, optical carrier (OC) interfaces, and/or asynchronous transfer mode (ATM) interfaces. In some embodiments, the communication device 124 can be, for example, a network interface card and/or the like that can include at least an Ethernet port and/or a wireless radio (e.g., a WiFi® radio, a Bluetooth® radio, etc.). In this manner, the communication device 124 can be configured to place the compute device 110 in communication with a network (not shown in FIG. 1 or 2) within which a portion of the CAPT system 100 can be stored and/or executed (e.g., a host device, server device, processing engine, etc.).

The I/O interfaces 128 can be, for example, a set of ports, interfaces, busses, connections, controllers, and/or the like that can be operatively coupled to an input and/or output device. For example the input device 111 (e.g., a keyboard) can be connected to the compute device 110 via a Universal Serial Bus (USB) port and one or more controllers; the display 112 can be connected to the compute device 110 via any suitable port such as a high-definition multimedia interface (HDMI) port, a USB port, a video graphics array (VGA), a digital visual interface (DVI) port, etc.); the one or more speakers 113 can be connected to the compute device 110 via an audio jack, a USB port, one or more busses, and/or the like; similarly, the one or more microphones 114 can be connected to the compute device 110 via an audio jack, a USB port, one or more busses, and/or the like. Although not shown, in some embodiments, the compute device 110 can include one or more converters or the like that can convert an analog signal to a digital signal and/or vice versa. For example, in some embodiments, the compute device 110 can include a digital-to-analog converter that can be connected to the speaker 113. Thus, the compute device 110 (e.g., the processor 130 and/or the like) can send a digital signal associated with a sound to the digital-to-analog converter, which can, in turn, convert the digital signal to an analog signal to be played by the speaker 113. In some instances, the compute device 110 can include an analog-to-digital converter that can be connected to the microphone 114. Thus, the microphone 114 can receive an analog sound (e.g., the user 102 speaking and/or uttering into the microphone 114, etc. (herein referred to as an "utterance")) that can be sent to the analog-to-digital converter, which can, in turn, convert the analog signal to a digital signal to be sent to a component of the compute device 110 (e.g., the processor 130 and/or a module) for processing by the CAPT system 100.

Although the user 102 is shown in FIG. 1 as interacting with the CAPT system 100 via the compute device 110, in other embodiments, any portion of the CAPT system 100 can be separate from and operatively coupled to the compute device 110 via, for example, a network. In this manner, the user 102 can interact with the separate portion of the CAPT system 100 (e.g., operatively coupled to the compute device 110 via the network) via the compute device 110 and the network. In such embodiments, the CAPT system 100 can be configured to include the compute device 110 (or portions thereof) along with any other suitable compute device. For example, the CAPT system 100 can include a host device, a server, a server array, and/or any other suitable compute device that is separate from, and in addition to, the compute device 110 of FIG. 1. The network can be, for example, a local area network (LAN), a wide area network (WAN), a metropolitan area network (MAN), a worldwide interoperability for microwave access network (WiMAX), a telephone network (such as the Public Switched Telephone Network (PSTN) and/or a Public Land Mobile Network (PLMN)), an intranet, the Internet, an optical fiber (or fiber optic)-based network, a virtual network, a cellular network, and/or any other suitable network. Moreover, the network can be implemented as a wired and/or wireless network. In some embodiments, the network can include one or more networks of any type such as, for example, a LAN and the Internet.

The processor 130 can be any suitable processing device configured to run or execute a set of instructions or code such as, for example, a general purpose processor (GPP), a central processing unit (CPU), an accelerated processing unit (APU), an application specific integrated circuit (ASIC), a network processor, a front end processor, a field programmable gate array (FPGA), and/or the like. As such, the memory 120 can store instructions to cause the processor 130 to execute modules, processes, and/or functions associated with using the CAPT system 100. As shown in FIG. 2, the processor 130 can include and/or can be configured to execute a machine translation module 140, an acoustic model module 150, and a recognition module 180. A module can be, for example, any assembly and/or set of operatively-coupled electrical components, and can include, for example, a memory, a processor, electrical traces, optical connectors, software (executing in hardware), and/or the like. For example, a module executed in the processor 130 can be any combination of hardware-based module (e.g., a field-programmable gate array (FPGA), an application specific integrated circuit (ASIC), a digital signal processor (DSP)) and/or software-based module (e.g., a module of computer code stored in the memory 120 and/or executed at the processor 130) capable of performing one or more specific functions associated with that module (e.g., the machine translation module 140, the acoustic model module 150, and/or the recognition module 180).

The machine translation module 140, the acoustic model module 150, and the recognition module 180 can be collectively configured to provide a CAPT to the user 102 when the user 102 is using the CAPT system 100. The machine translation module 140, the acoustic model module 150, and the recognition module 180 can be configured to, for example, model and/or predict a phonological error that is likely to be made by the user, model and/or recognize an utterance (e.g., a word or phrase spoken) of the user in a non-native language, and provide actionable feedback to the user 102. For example, in some embodiments, the machine translation module 140 can be configured to use one or more statistical machine translation techniques that can receive a parallel corpus having phonemes, words, sentences, paragraphs, etc. in both a native and non-native language, and in both audio and text format. As such, the translation techniques can be configured to map the native and non-native languages to define a non-native lexicon as well as a set of hypotheses (e.g., alternative pronunciations or recitations) associated with likely phonological errors, as described in further detail herein. The acoustic model module 150 can be configured to perform and/or execute one or more iterative processes (described in further detail herein) associated with defining an acoustic model. The acoustic model can be used, for example, in utterance recognition and/or the like, as described in further detail herein. The recognition module 180 can be configured to recognize an utterance spoken by the user based, at least in part, on the hypotheses and non-native lexicon defined by and/or produced at the machine translation module 140 and the acoustic model defined by and/or produced at the acoustic model module 150. In addition, the recognition module 180 can be configured to define and/or otherwise generate actionable feedback associated with the user's errors. The feedback can, for example, be represented on the display 112 of the compute device 110.

Figure 3:
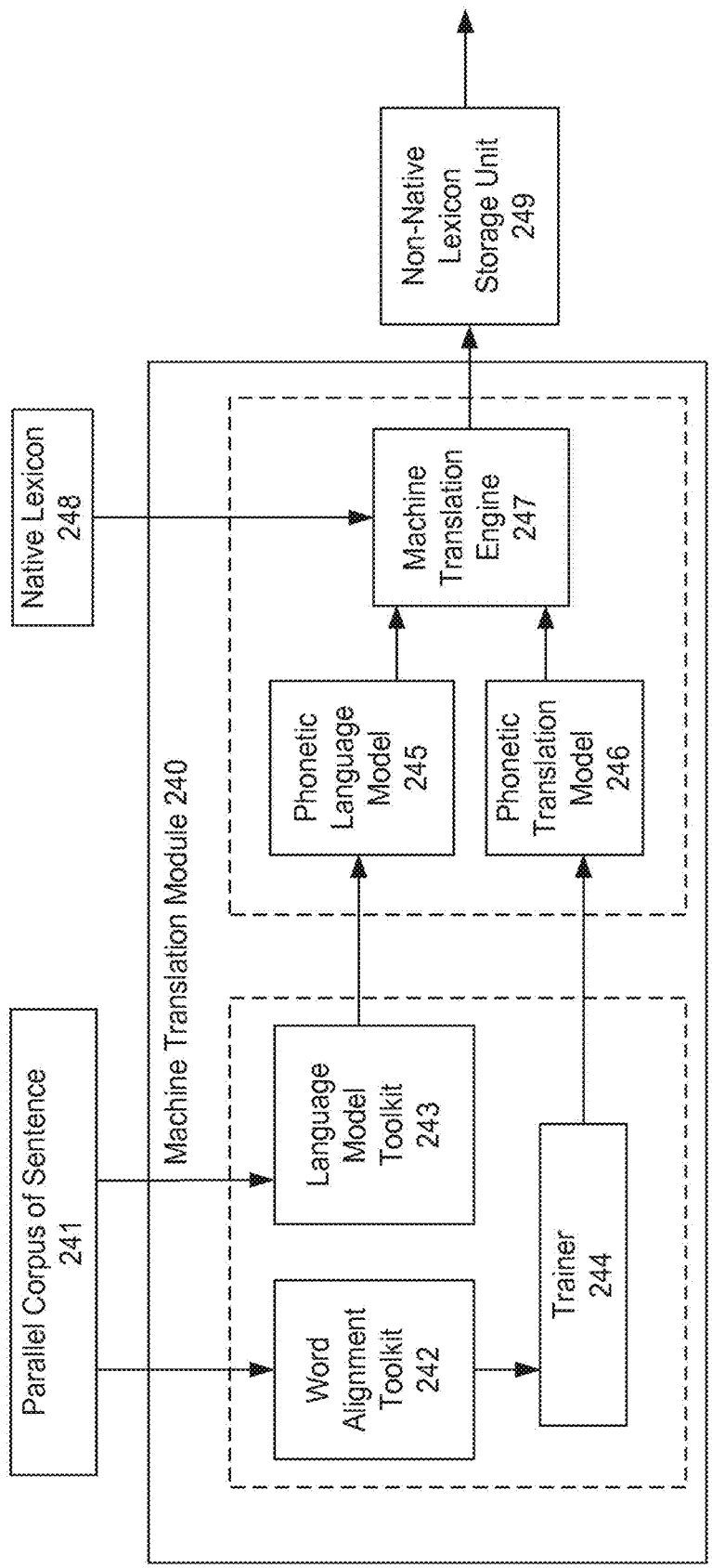
FIG. 3 is a schematic illustration of a machine translation module of a CAPT system, according to an embodiment.

FIG. 3 is a schematic illustration of a machine translation module 240 of a CAPT system (e.g., the CAPT system 100 of FIGS. 1 and 2). The machine translation module 240 can be substantially similar to or the same as the machine translation module 140 of the processor 130 included in the compute device 110 of the CAPT system 100. In some embodiments, the machine translation module 240 can be a phonological error modeling (PEM) system that can use, for example, one or more statistical machine translation (MT) techniques to model phonological errors at the lexical level (i.e., the word level) in a non-native language. For example, the machine translation module 140 can analyze a native/canonical phone sequence (e.g., pronunciation) in a native language (L1) and then generate a best non-native phone sequence (target language (L2) to be learned) that is a relatively good representative translation of the native/canonical pronunciation for a given L1 population (native language speakers). Said another way, the machine translation module 240 can provide and/or be otherwise used to form a statistical framework that can model phonological errors such as substitutions, deletions, and/or insertions of sounds. For example, the machine translation module 240 can determine, based at least partially on phonetically annotated data, that a learner having a native language of Korean may substitute an "L" sound for an "R" or vice versa when speaking a non-native language of English In some instances, the machine translation module 140 can be configured to model phonological errors and to model dependencies between error rules. In some instances, the machine translation module 140 can also be configured to provide a principled search paradigm that is capable of generating N-best non-native pronunciations for a given canonical pronunciation, as described in further detail herein. In some instances, the MT techniques can be modeled in and/or by the machine translation module 140 and can be represented by the Bayesian formulation as follows:

$$P(T|S) = \arg\max_T P(S|T) \cdot P(T) \quad (1)$$

where, T and S are word sequences in the non-native language and native language, respectively. P(S|T) is a translation model of the phonological transformations between the canonical and non-native phone sequence. P(T) represents a language model of the non-native language in a traditional MT function. In some embodiments, the machine translation module 140 can be configured to employ and/or execute, for example, a Moses phrase-based machine translation system.

As shown, for example, in FIG. 3, the machine translation module 240 can be configured to receive a parallel corpus of a sentence 241 (also referred to herein as "parallel corpus"). The parallel corpus 241 can be, for example, a word, a sentence, a string of sentences, a paragraph, and/or the like in a first language (e.g., a source language or native language) and a second language (e.g., a target language or non-native language) in an audio and text format. In some instances, the parallel corpus 241 can include native or canonical pronunciations (e.g., phone sequences) and annotated phone sequences (e.g., non-native pronunciations) from the non-native language L2. In some instances, the parallel corpus 241 can include prompted speech data from an assortment of different types of content. Moreover, the parallel corpus 241 can include minimal pairs (e.g., right/light), stress minimal pairs (e.g., CONtent/conTENT), short paragraphs of text, sentence prompts, isolated loan words, and/or words with particularly difficult consonant clusters (e.g., refrigerator). Phone level annotation of each corpus can be performed by, for example, one or more human annotators (e.g., 3 annotators). Thus, the parallel corpus 241 can be a representation of what one is prompted to say versus what was actually said.

The machine translation module 240 can include, for example, a word alignment toolkit 242 and a language model toolkit 243 both of which can receive the parallel corpus 241 (e.g., the toolkits 242 and 243 can each be at least a software module and/or hardware module that can receive, as input, the parallel corpus 241). The machine translation module 240 can execute one or more processes, functions, routines, subroutines, and/or modules to define, for example, a phonetic language model 245 (e.g., the P(T) term in equation (1)) and a phonetic translation model 246 (e.g., the P(S|T) term in equation (1)) that can be sent to a machine translation engine 247 included in the machine translation module 240, as described in further detail herein. The word alignment toolkit 242 can align phones (e.g., segments of a word) in the native language with corresponding phones in the non-native language and vice versa (i.e., in both directions). In some embodiments, the word alignment toolkit 242 can be based, at least partially, on a Giza++ toolkit (e.g., an implementation of an IBM machine translation model). As such, the word alignment toolkit 242 can define, for example, a one-to-one mapping of at least a portion of the phones in the parallel corpus 241.

As shown in FIG. 3, the word alignment toolkit 242 can send a signal associated with the alignment of the phones to a trainer 244. In some embodiments, the trainer 244 can be, for example, a set of processes, functions, modules, routine and/or subroutines executed by the machine translation module 240. As such, the trainer 244 can perform one or more functions associated with transforming the alignments received from the word alignment toolkit 242. For example, the trainer 244 can grow and/or expand the phone alignments into one or more phrasal alignments (e.g., phrase-chunk alignments). In some embodiments, the trainer 244 can reconcile an alignment of a phone in the native language with a corresponding phone in the non-native language and can reconcile an alignment of the phone in the non-native language to the corresponding phone in the native language to define, for example, two phone alignments. In some embodiments, the trainer 244 can be based, at least partially, on a known Moses training method such as, for example, minimum error rate training (MERT).

In some instances, the two phone alignments can be reconciled by obtaining an intersection with high precision alignment points (e.g., points carrying high confidence of alignment). As such, the union of high precision alignment points can produce, for example, high recall alignment points. In some instances, the trainer 244 can be configured to grow and/or expand the alignments by adding an alignment point that is within the union of the two word alignments (e.g., having both high precision and high recall) using, for example, expansion heuristics and/or the like. By way of example, if p1, p2 and p3 are native phones (e.g., phones in the source language) and np1, np2, np3 are non-native phones (e.g., phones in the target language), each of which occur one after the other in a sample phone sequence, the one-to-one phone alignments defined by the word alignment toolkit 242 can be p1-to np1, p2-to-np2 and p3-to-np3 (i.e., three separate phone alignments). Accordingly, the trainer 244 can grow the one-to-one phone alignments into, for example, a phone-chunk alignment p1p2p3-to-np1np2np3 (i.e., a single phrasal alignment). In this manner, the trainer 244 can define phrase pairs of different word lengths with corresponding phrase translation probabilities based on their relative frequency of occurrence in the parallel corpus 241.

With the trainer 244 defining the word alignments and/or the phrasal alignments, the machine translation module 240 can execute one or more processes, functions, and/or modules to define the phonetic translation model 246. Although shown as a separate process and/or function in FIG. 3, in some embodiments, the function of the trainer 244 and the function to define the phonetic translation model 246 can be defined in a similar and/or otherwise related function and/or process.

As described above, the language model toolkit 243 can receive the parallel corpus 241 in a similar manner as the word alignment toolkit 242. The language model toolkit 243 can determine the most probable sequence of words that occur in the non-native language. In some embodiments, language model toolkit 243 can be based, at least partially, on an open-native language modeling toolkit such as, for example, SRI-LM, RandLM, and/or IRST-LM. As such, the language model toolkit 243 can define, for example, a tri-gram non-native phone language. In some instances, the tri-gram non-native phone language can have, for example, Witten-Bell smoothing and/or any other smoothing operation, process, and/or function. With the tri-gram non-native phone language defined, the machine translation module 240 can execute one or more processes, functions, and/or modules to define the phonetic language model 245. The phonetic language model 245 can define and/or otherwise represent prior knowledge about the non-native language, as described in further detail herein. Although shown separately, in some embodiments, the function of the language model toolkit 243 and the function of the phonetic language model 245 can be performed in a similar and/or otherwise related function and/or process.

The machine translation engine 247 is configured to receive the phonetic language model 245 and the phonetic translation model 246 to define and/or otherwise generate, for example, a list of the best alternatives to a sequence of words in the non-native language that could potentially be uttered by a learner (e.g., the user 102 in FIG. 1). The machine translation engine 247 can use and/or otherwise execute one or more processes and/or functions associated with a beam search to generate an N-best alternative non-native phone sequences in the non-native language for any native pronunciation. At each state, a cost (generally computed in terms of probability) of the hypotheses is computed by combining the cost of previous state with the cost of translating the current phrase and the language model cost of the phrase. The cost can include and/or otherwise define a distortion metric that can take into account the difference in phrasal positions between the native and the non-native language. Competing hypotheses can potentially be of different lengths (e.g., a word can compete with a phrase as a potential translation). As such, a future cost can be estimated for each competing path and, since the number of competing paths can be very large, competing paths can be pruned away using a beam, which can be based, at least partially, on a combination of a cost threshold and histogram pruning. In some embodiments, the machine translation engine 247 can be based, at least partially, on a known Moses decoder method.

As shown in FIG. 3, the machine translation engine 247 can receive a native lexicon 248. The native lexicon 248 can be, for example, data associated with a pronouncing dictionary, which can be transcribed, for example, using the International Phonetic Alphabet (IPA). As such the machine translation engine 247 can receive the phonetic language model 245, the phonetic translation model 246, and the native lexicon 248 to define N-best alternative non-native phone sequences for a given canonical native phone sequence (e.g., as included in the native lexicon 248). In some embodiments, the machine translation engine 247 can define a 4-best list of non-native pronunciation hypotheses (e.g., alternatives). As shown in FIG. 3, the machine translation engine 247 can be configured to send a signal associated with the N-best hypotheses to a non-native lexicon storage unit 249. In some embodiments, the non-native lexicon storage unit 249 can be stored, for example, in the database 122. In other embodiments, the machine translation module 240 can include the non-native lexicon storage unit 249. Although the machine translation module 240 is described above as executing one or more processes associated with the word alignment toolkit 242, the language model toolkit 243, the trainer 244 and the machine translation engine 247, and defining the phone language model 245 and phone translation model 246, in other embodiments, any of the processes, functions, routine, subroutines, and/or the like can be performed in similar processes and/or functions. Moreover, any of the processes and/or functions can be, for example, modules and/or sub-modules included in the machine translation module 240.

Figure 4:
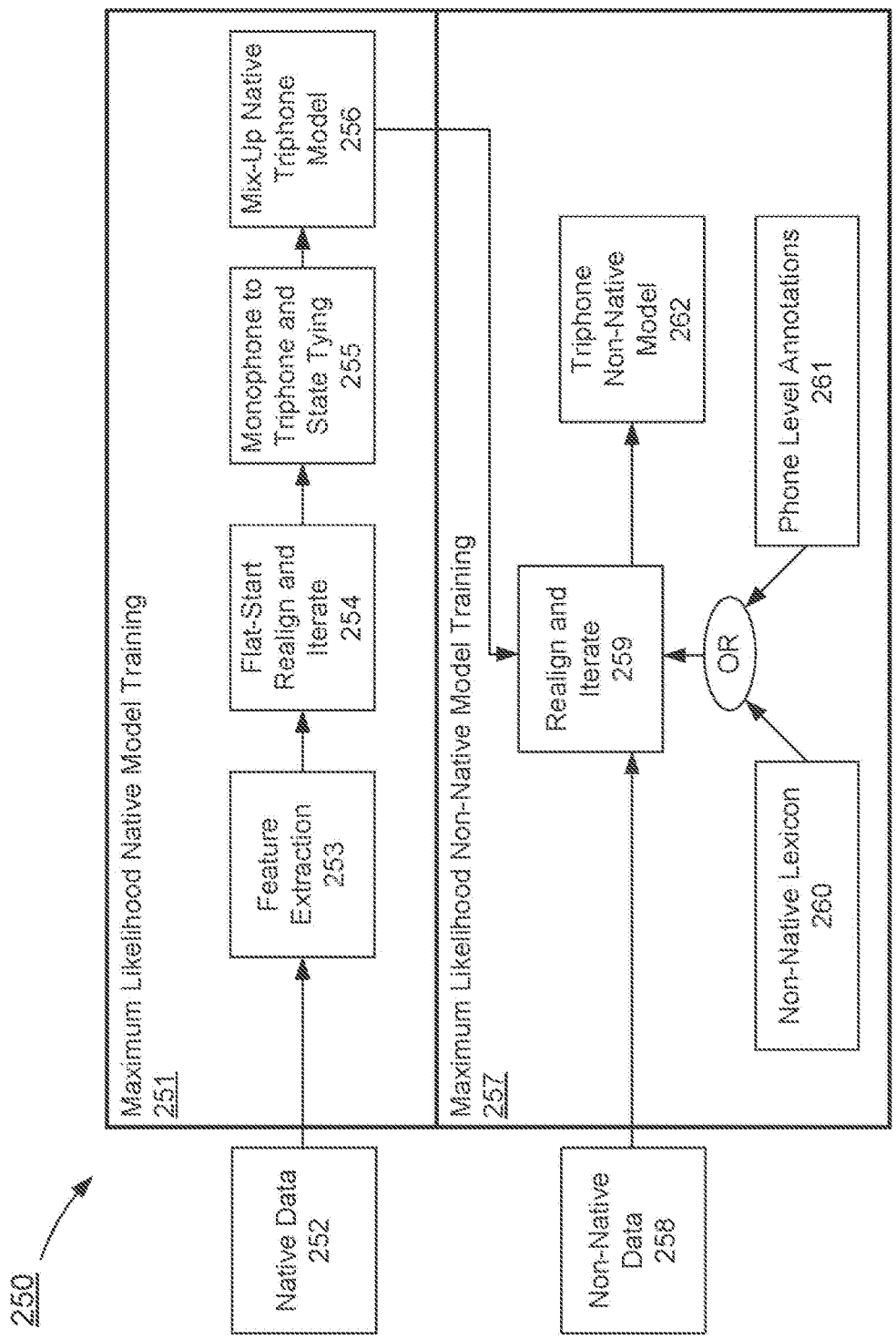
FIGS. 4 and 5 are schematic illustrations of an acoustic model module of a CAPT system, according to an embodiment.
Figure 5:
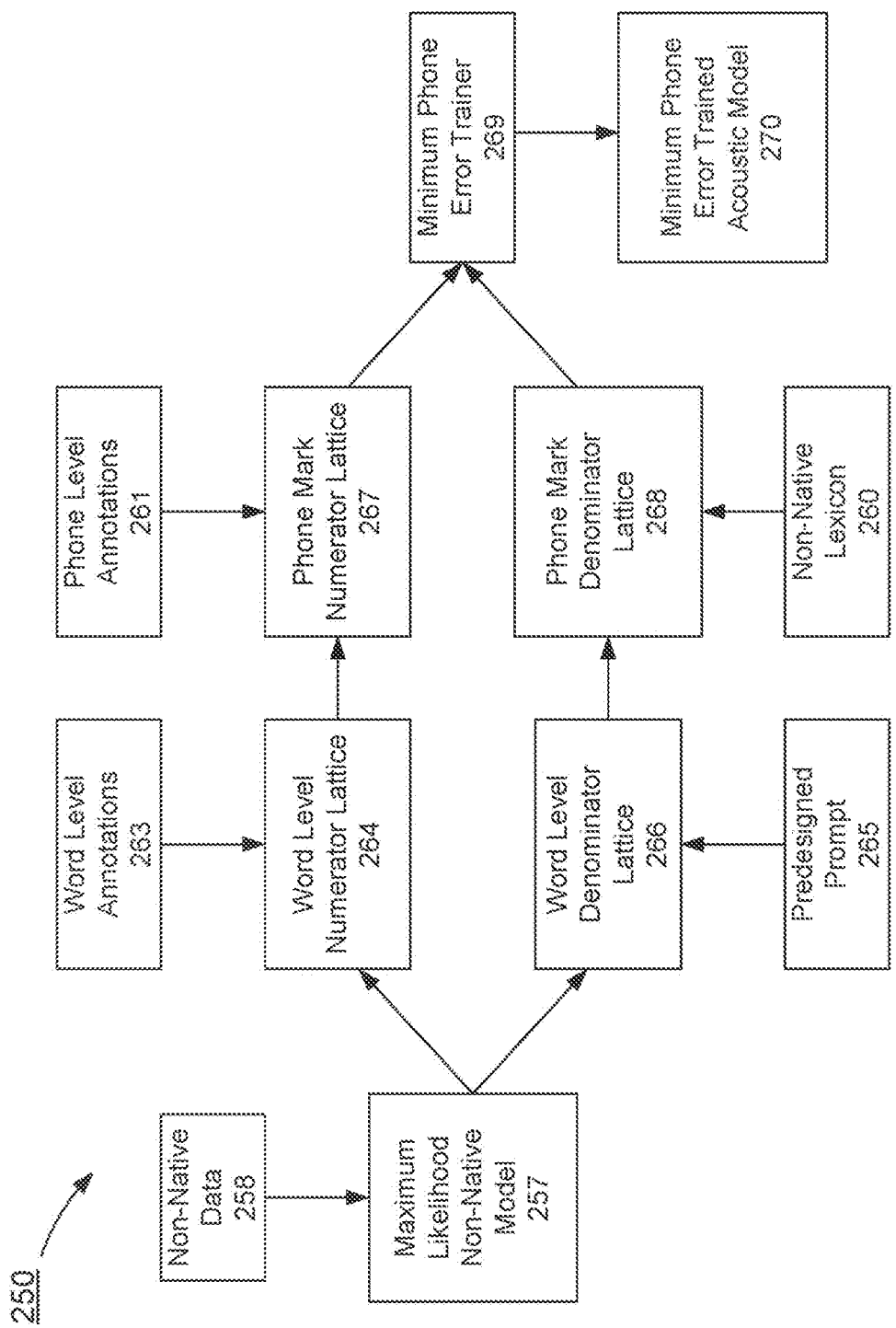

FIGS. 4 and 5 illustrate an example of an acoustic model module 250 of a CAPT system (e.g., the CAPT system 100 of FIGS. 1 and 2). The acoustic model module 250 can be substantially similar to or the same as the acoustic model module 150 included in the processor 130 included in the compute device 110 of the CAPT system 100. The acoustic model module 250 can use one or more techniques to model phonological errors at the acoustic level (i.e., the acoustics of an utterance of a phoneme). Similarly stated, the acoustic model module 250 can be configured to perform one or more processes, functions, routines, subroutines, and/or the like to define an acoustic model.

More specifically, as shown in FIG. 4, the acoustic model module 250 can execute one or more processes, functions, and/or modules associated with a Maximum Likelihood (ML) native model training 251 and a ML non-native model training 257, to define, at least partially, a qualitative pronunciation score based on the acoustic closeness of a learner's (e.g., the user 102 in FIG. 1) pronunciation relative to the canonical pronunciation. As such, the acoustic model module 250 can use data associated with non-native pronunciations in an acoustic modeling process to improve, for example, discriminability between confusable phonemes in the non-native acoustics. Said another way, the acoustic model module 250 can define an acoustic model that can, for example, provide instructions and/or otherwise guide a conversion of an acoustic event from audio (e.g., speech features such as phoneme, and/or the like) into probabilities associated with the likelihood of each sound.

As shown in FIG. 4, the acoustic model module 250 can execute one or more processes to train (e.g., incrementally improve) the ML native model 251 based, at least partially, on the learner's voice (e.g., the user 102 of FIG. 1). For example, a feature extraction process and/or sub-module 253 can receive native data 252 (e.g., a corpus of multiple utterances, multiple words, multiple phrases, and/or multiple sentences from a set of native speakers, in text and corresponding audio format). The acoustic model module 250 can execute one or more processes and/or functions associated with feature extraction 253 to extract, for example, acoustic-phonetic feature space included in the native data 252. In some embodiments, the acoustic-phonetic feature space can be, for example, a one-mixture monophone. As shown, the acoustic model module 250 can train a one-mixture monophone model using, for example, a flat start, realign, and iterate process 254. For example, in some instances, the acoustic model module 250 can execute one or more functions that can initialize a one-mixture monophone with a flat-start process wherein a Gaussian distribution of native data (e.g., a Gaussian Mixture Model) is related to the same global mean and/or variance (i.e., a single mean and/or variance). The acoustic model module 250 can then iteratively re-estimate and realign the acoustic-phonetic feature to define a trained one-mixture monophone. In some instances, the acoustic model module 250 can execute one or more processes and/or functions that can clone the trained one-mixture monophone to define, for example, a triphone model. More particularly, a triphone model can be defined by considering the phone (e.g., the state) directly prior to and directly after the trained one-mixture monophone (for example, using the word "art", the triphone model models what happens to the /r/ sound when /a/ comes before it and when /t/ comes after it). As shown in FIG. 4, the monophone and triphone can each be state tied (e.g., the phones defining a triphone can be "state tied" in which the triphone is considered on a whole rather than each phone in the triphone) in a monophone to triphone and state tying process 255. The acoustic model module 250 can then execute one or more processes and/or functions to incrementally increase the monophone mixtures and the triphone mixtures in, for example, a mix up native triphone model 256 such that the acoustic model module 250 defines a set of trained triphone mixtures.

As shown in FIG. 4, the acoustic model module 250 can execute one or more processes and/or functions associated with the ML non-native model 257. For example, the trained triphone mixtures from the ML native model 251 and non-native data 258 (e.g., non-native utterances, phones, words, etc.) can be used, for example, in a realign and iterate process 259. The realign and iterate process 259 can receive, as input, the triphone mixtures from the ML native model 251, the non-native data 258, and a non-native lexicon 260 (e.g., from the non-native lexicon storage unit 249 of the machine translation module 240) or a phone level annotation 261 (e.g., according to a predetermined selection of either the non-native lexicon 260 or the phone level annotation 261). For example, in some instances such as when large amounts of unannotated data is available, unannotated data and the non-native lexicon 260 can be used in the realign and iterate process 259. In this manner, the process can be iterated any number of times to define, for example, a triphone non-native model 262.

In some instances, the acoustic model module 250 can use discriminative training (DT) techniques, for example, in conjunction with the processes and/or functions associated with the ML native model 251 and the ML non-native model 257 to increase the accuracy, precision, and/or recall of an acoustic model. For example, the acoustic model module 250 can use DT techniques such as, word error rate (WER), minimum word error (MWE), and minimum phone error (MPE). In some embodiments, the acoustic model module 250 can use a minimum phone error (MPE) technique that is represented as the function below:

$$f_{MPE}(\theta) = \sum_{r=1}^{R} \sum_{S} P_\theta^k(S|O_r) \cdot A(S, S_r) \quad (2)$$

where R is the number of training sentences and $O_r$ is the observation sequence. $A(S, S_r)$ is the raw phone transcription accuracy of a sentence S measured against a reference sentence $S_r$. $P_0^k(S|O_r)$ is the scaled posterior probability of the sentence S given by the formula below:

$$P_\theta^k(S|O_r) = \frac{P_\theta(O_r|S)^k \cdot P(S)^k}{\sum_u P_\theta(O_r|u)^k \cdot P(u)^k} \quad (3)$$

The parameter k is a scaling factor based on the acoustic and language model log likelihoods and controls the smoothness of the objective function. In some embodiments, the acoustic model module 250 can include and/or execute, for example, an Extended Baum-Welch algorithm to define a set of lattices, which can compactly represent the correct transcription and other competing transcriptions for an expected utterance. As shown in equation (3), the numerator lattice (e.g., a data structure such as a directed acyclic graph (DAG) that can include words and/or sounds along with its associated beginning and ending time) can represent the correct word transcriptions that are phone marked by the canonical pronunciation of the words. The denominator lattice in equation (3) can represent the competing hypotheses that can be, for example, approximated by a large vocabulary recognizer along with a language model (e.g., such as the language model 245). As this technique uses canonical pronunciations for the correct word transcriptions, it aims at increasing the discrimination between confusable words with similar canonical pronunciations.

As shown in FIG. 5, the acoustic model module 250 can execute one or more processes, functions, routine, subroutine, modules, sub-modules, and/or the like to define and/or otherwise generate a minimum phone error trained acoustic model 270. For example, the acoustic model module 250 can execute one or more processes and/or functions such that the non-native data 258 is input into the processes associated with the ML non-native model 257 and, as a result of training (as described above), can define a word level numerator lattice 264 and a word level denominator lattice 266. As shown, the word level numerator lattice 264 can include and/or can be at least partially based on data associated with word level annotations 263 (e.g., alignments of an utterance with the canonical utterance from a native speaker) and the word level denominator lattice 265 can include and/or can be at least partially based on data associated with a predesigned prompt 265 (e.g., fixing the beginning and end times of the utterance to define one or more alternative arcs for each utterance that includes the alternative pronunciations from the non-native lexicon that is generated via the machine-translation module 240). The acoustic model module 250 can further be configured to receive (e.g., as an input into a software module and/or the like) data associated with phone level annotations 261 to define a phone marked numerator lattice 267 and can receive (e.g., as an input into a software module and/or the like) data associated with the non-native lexicon 260 to define a phone marked denominator lattice 268. In this manner, the acoustic model module 250 can execute one or more processes and/or functions associated with an MPE trainer 269 that can use (e.g., as an input into a software module and/or the like) the phone marked numerator lattice 267 and the phone marked denominator lattice 268 to produce, define, and/or otherwise generate the minimum phone error (MPE) trained acoustic model 270, as shown in FIG. 5.

In some embodiments, the acoustic model module 250 can constrain and/or otherwise limit data associated with the phone marked denominator lattice 268. For example, the acoustic model module 250 can perform and/or execute a constrained MPE process wherein the phone marked denominator lattice 268 (represented mathematically in equation (3)) is constrained and/or otherwise limited to data associated with competing pronunciation alternatives of the words, as described above. As such, the term $S_r$ in equation (2) is the annotated phone sequence. Thus, the constrained MPE can differ from and be an improvement over known MPE techniques in which the denominator lattice includes canonical pronunciations of the word. As a result, when S approaches $S_r$ (in equation (2)), the phone transcription accuracy ($A(S, S_r)$) increases, which, in turn, substantially maximizes the objective function of equation (2).

For example, Table 1 and Table 2 below chart the accuracy, precision, recall, and F-1 performance of various configurations of the acoustic model generated or defined by the acoustic model module 250 and/or the like. Table 1 illustrates an example performance of acoustic models in phone detection. In this example, a maximum likelihood native model with a native lexicon (see e.g., FIG. 4) is used as a baseline and has an 81% accuracy. As shown, the constrained MPE training (see e.g., FIG. 5) presents the best performance in accuracy, precision, recall, and F-1 (i.e., the harmonic mean of precision and recall) with respect to Phone Detection of the acoustic model.

TABLE 1

Phone Detection performance of acoustic models

| RS-KLE | Accuracy | Precision | Recall | F-1 |
|---|---|---|---|---|
| ML native model + native lexicon | 81.0 | | | |
| ML native model + non-native lexicon | 78.9 | 35.3 | 36.6 | 35.9 |
| MPE native model + non-native lexicon | 79.6 | 37.2 | 36.8 | 37.0 |
| ML non-native model (from unannotated data) + non-native lexicon | 78.9 | 35.8 | 38.7 | 37.2 |
| ML non-native model (from annotated data) + non-native lexicon | 81.9 | 44.8 | 42.3 | 43.5 |
| MPE non-native model (from annotated data) + non-native lexicon | 82.7 | 47.3 | 42.4 | 44.7 |
| Inter-grader | 85.3 | 53.2 | 59.6 | 56.2 |

Table 2 illustrates an example performance of the acoustic models in phone identification. Again, a maximum likelihood native model with a native lexicon (see e.g., FIG. 4) is used as a baseline with an accuracy of 80%. As shown, the constrained MPE training (see e.g., FIG. 5) presents the best performance in accuracy, precision, recall, and F-1 with respect to Phone Identification.

TABLE 2

Phone Detection performance of acoustic models

| RS-KLE | Accuracy | Precision | Recall | F-1 |
|---|---|---|---|---|
| ML native model + native lexicon | 80.0 | | | |
| ML native model + non-native lexicon | 76.6 | 21.3 | 21.8 | 21.5 |
| MPE native model + non-native lexicon | 77.4 | 22.8 | 22.3 | 22.5 |
| ML non-native model (from unannotated data) + non-native lexicon | 76.6 | 22.1 | 23.5 | 22.8 |
| ML non-native model (from annotated data) + non-native lexicon | 79.6 | 29.2 | 27.1 | 28.1 |
| MPE non-native model (from annotated data) + non-native lexicon | 80.4 | 31.1 | 27.3 | 29.1 |
| Inter-grader | 82.1 | 36.1 | 40.4 | 38.2 |

Figure 6:
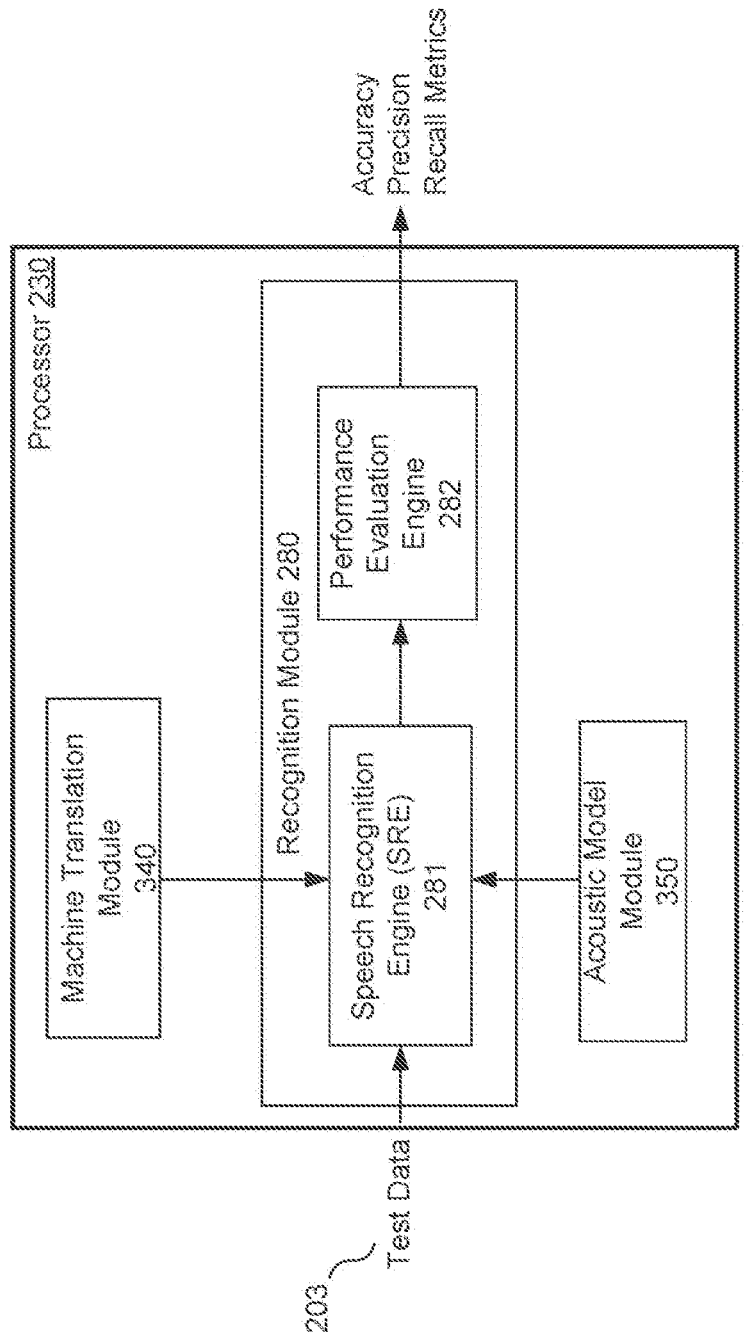
FIG. 6 is a schematic illustration of a machine translation module, an acoustic model module, and a recognition module of a CAPT system, according to an embodiment.

FIG. 6 is an example of a recognition module 280. The recognition module 280 can be substantially similar to or the same as the recognition module 180 of the processor 130 shown in FIG. 2. The recognition module 280 can receive test data 203 (e.g., utterances from a language learner) and, once received, can recognize the data 203, determine phonological errors in the data 203, and/or define a performance evaluation that can include actionable feedback to the language learner (e.g., the user 102 in FIG. 1). The recognition module 280 can include a speech recognition engine (SRE) 281 and a performance evaluation engine 282. The recognition module 280, and more specifically the SRE 281, can receive N-best hypotheses from a machine translation module 340 and an MPE trained acoustic model from the acoustic model module 350. The machine translation module 340 and the acoustic model module 350 can be substantially similar to or the same as the machine translation module 240 of FIG. 3 and the acoustic model module 250 of FIGS. 4 and 5, respectively. Thus, the machine translation module 340 and the acoustic model module 350 are not described in further detail herein.

The SRE 281 can use the N-best hypotheses defined by the machine translation module 340 to define a grammar that covers the errors for the SRE 281. The SRE 281 can use the MPE trained acoustic model defined by the acoustic model module 350 to determine and/or verify whether the learner (e.g., the user 102 in FIG. 1) spoke the expected response, for example, using an open phone loop and the N-best hypotheses as competing models. If the utterance does not match the acoustic model defined by the acoustic model module 350 (e.g., the utterance verification fails), the words actually spoken by the user 102 are identified, verified, and/or approximated using the best N-best hypotheses defined by the machine translation module 340.

In some instances, SRE 281 can define a raw SRE log likelihood of the MT N-best list, which are first normalized by a corresponding log likelihood obtained from a free running phone loop in a goodness of pronunciation (GOP) score. For example, a word-based speech recognizer that is constrained to recognize expected phrase (e.g., from the N-best list) can be used in parallel with a phoneme-based speech recognizer that is unconstrained to recognize any sound freely. Thus, two acoustic match scores can be generated and/or otherwise defined and can be used to generate and/or otherwise define a normalized GOP score. The normalized log likelihood of the expected response is denoted by $\eta_{expected}$. This likelihood is compared to a threshold value $t^{PL}$ to verify the expected phrase is sufficiently close to the best possible acoustic match (e.g., defined by the acoustic model module 350) as described by the equation below:

$$\eta_{expected}^{SRE} > t^{PL} \quad (4)$$

Furthermore, the normalized log likelihood of an ith item in the N-best list of the SRE can be represented as $\eta_i^{SRE}$ and the list with a scaled log likelihood of the N-best list defined by the machine translation module 340 can be represented as $l_i^{FM}$. Therefore, the best alternative after rescoring can be described by the equation below:

$$l_{best} = \arg\max_i(\eta_i^{SRE} + \alpha l_i^{FM}) \quad (5)$$

Thus, the rescored log likelihood of the expected response should be less than a distance-from-best threshold represented as $t^{DFB}$ and can be described by the equation below:

$$l_{expected} - l_{best} > t^{DFB} \quad (6)$$

In this manner, an utterance can be accepted if the condition described by equation (4) and the condition described by equation (6) are satisfied. As such, if the utterance is identified (e.g., the utterance is verified), the SRE 281 can return the expected phrase as the recognition result; otherwise, the words that were used by the SRE 281 for the best hypothesis in the N-best list are returned.

The CAPT systems described above (e.g., the CAPT system 100) can evaluate the performance of lexical error detection, the performance of the N-best error definition, the performance of the acoustic recognition, and the performance of the speech recognition. The following is a detailed description of a CAPT system that was used as part of an example study. The results from this study are included below. The CAPT system in the study included a corpus (such as the corpus 241 in FIG. 3) that included dialogues such as buying items at a coffee shop, asking for directions, and seeking assistance on an airplane flight. The corpus contained 250,000 transcribed utterances by Korean (65%), Japanese (24%), and Chinese (11%) learners of English. Each dialogue had, on average, 20 different phrases that the learner practiced in different contexts. For each dialogue, the learner started by viewing an example preview of the dialogue, in which that learner heard a native speaker speak at least a portion of the dialogue. Next in sequence, the learner practiced his or her lines for isolated pieces of dialogue. Finally, the learner performed the dialogue without the help of prompts. If the learner had trouble with a certain line of dialogue, he or she was directed to practice that line in smaller chunks. The success of the learner determined which tasks he or she would face in the future.

As a result of this process, the learners produced phrases in different modes such as using a pre-trained phrase in an appropriate context in a conversation without viewing the corresponding text (70%), parroting a native speaker without viewing the corresponding text (19%), and parroting a native speaker while viewing the text (110%). The utterances were transcribed. The data was used to produce a parallel corpus of native English and language learner English. The data also included phrase pairs that were not useful for training the MT system (e.g., the machine translation module 140 described above with reference to FIGS. 2 and 3). The corpus was supplemented, to provide a greater variety, with proficiency tests taken by 1300 Japanese learners of English. The corpus was annotated by tags that correct the mistakes the learners made during the interview. The tags were used to define at least a part of a parallel corpus, which added 22,000 utterances to the training set.

24,000 sentences were randomly selected from the corpus and used as the test set. The corpus contained a large number of actual learner responses for each expected learner response. For this test, the MT system (e.g., the machine translation module 140) already had the expected learner responses in the training phase (even though it did not have the actual learner responses of the test set). This provided and/or established an upper bound for system generalization performance when the amount of training data increased. This can be termed the closed phrase set in the experiment.

To make a fairer test of the system, the MT system's generalization ability was tested by separating one dialogue from the training corpus and used as a test dialogue. Thus, unless by chance the same phrase appeared in both the test dialogue and one of the training dialogues, the MT system (e.g., the machine translation modules 140 and/or 240) had to generalize to unseen expected learner responses. This test was done 4 times for different dialogues and the results were averaged. Dialogues were selected that had a large number of utterances and that included topics that did not overlap other dialogues remaining in the training set with, on average, 8,000 utterances. This test can be termed the open phrase set in the experiment.

The system included modules substantially similar to those described above with reference to the system 100 (e.g., the machine translation module 140, the acoustic model module 150, and the recognition module 180). The performance of the system was measured with three metrics. The first metric was associated with the performance of the MT system (e.g., the machine translation module 140) in modeling the learner errors. Sentences of the test set that included user-made errors were used. For each utterance in this set, the expected learner response was used as the input of the MT system to define a list of N-best hypotheses. If an exact match of the actual learner response was found in the N-best list, then that error had been covered, matched, and/or otherwise anticipated by the MT system and the measure was termed sentence coverage. The word level statistics were also calculated using the N-best hypotheses with the lowest edit distance compared to the actual learner response. The error rate $e_{WER}$ was calculated in the same way as word error rate (WER) and the accuracy (100%−$e_{WER}$) was calculated.

For every utterance in the test set, the N-best hypotheses were generated from the expected learner response Grammar data, based on the N-best hypotheses, was constructed and a speech recognition engine (e.g., at the SRE 281 included in the recognition module 280 of FIG. 6) was used to recognize the given utterances, and the WER was reported.

The performance of utterance verification part of the SRE recognition process was also measured. The process was similar to what was used for calculating WER, except with a focus on whether the sentence was completely correct or not. Utterance verification results were reported at the operating point where the percentage of false accepts and false negatives is equal, the so-called equal error rate (EER).

Figure 7:
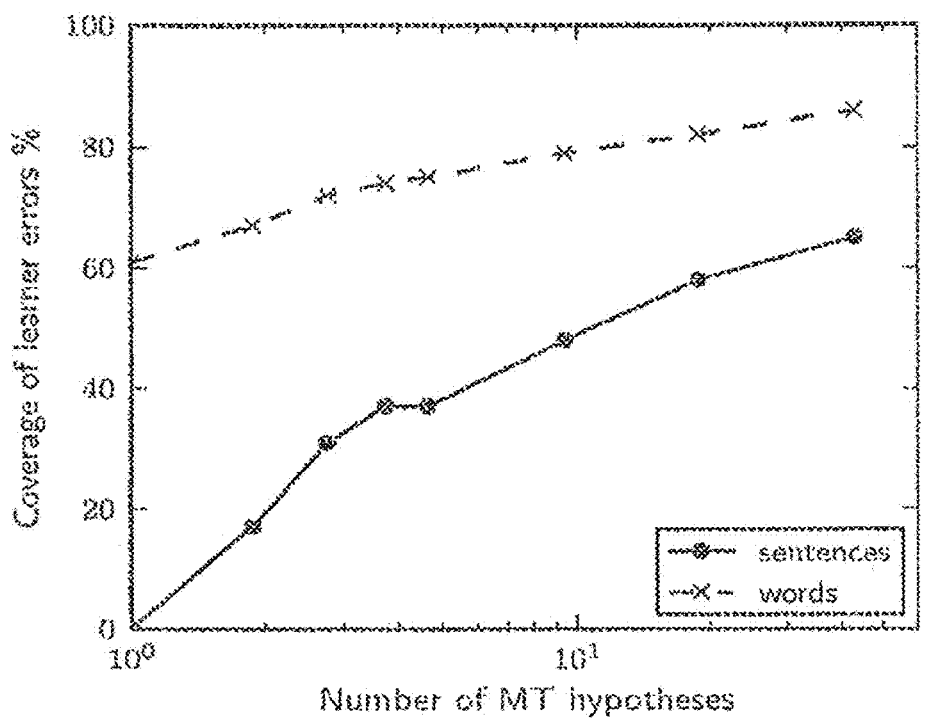
FIGS. 7 and 8 are graphs illustrating a coverage of learner errors relative to a number of machine translation hypotheses produced by a CAPT system in a closed phrase set and an open phrase set, respectively, according to an embodiment.
Figure 8:
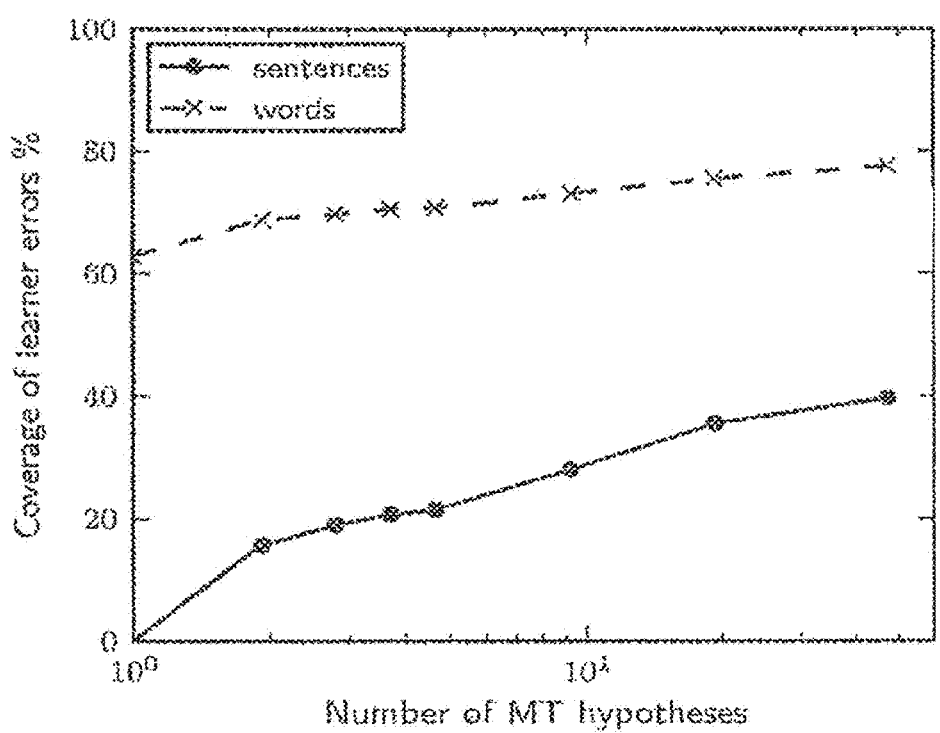

The results for the coverage test are presented in graphical format in FIGS. 7 and 8. As shown, the coverage increases logarithmically with respect to the number of N-best hypotheses that were used (e.g., defined by the machine translation module 140). The coverage increases more slowly for the open set.

In the speech recognition tests, the MT interpolation coefficient α as well as the utterance verification thresholds $t^{PL}$ and $t^{DBF}$ (described in equations 4-6 above) were optimized on the development data set by a numeric grid search. The parameters were optimized separately for utterance verification and for sentence recognition. The improvement in utterance verification rate and WER was calculated relative to using only the expected learner response as the grammar data.

Figure 9:
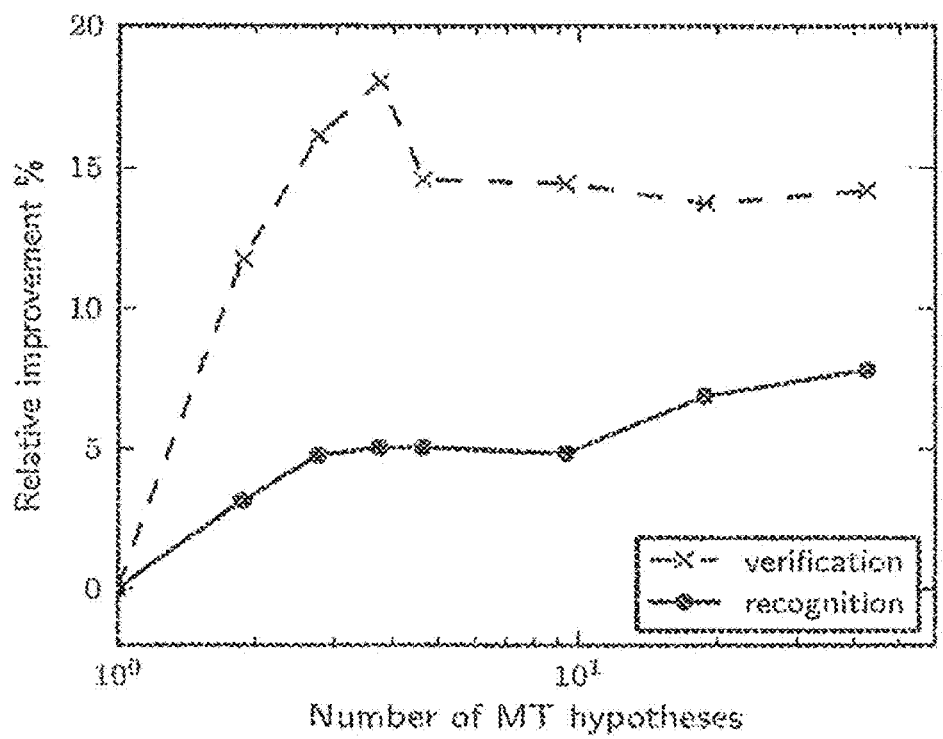
FIGS. 9 and 10 are graphs illustrating a relative improvement of utterance verification and word recognition error rates relative to a number of machine translation hypotheses produced by a CAPT system in a closed phrase set and an open phrase set, respectively, according to an embodiment.
Figure 10:
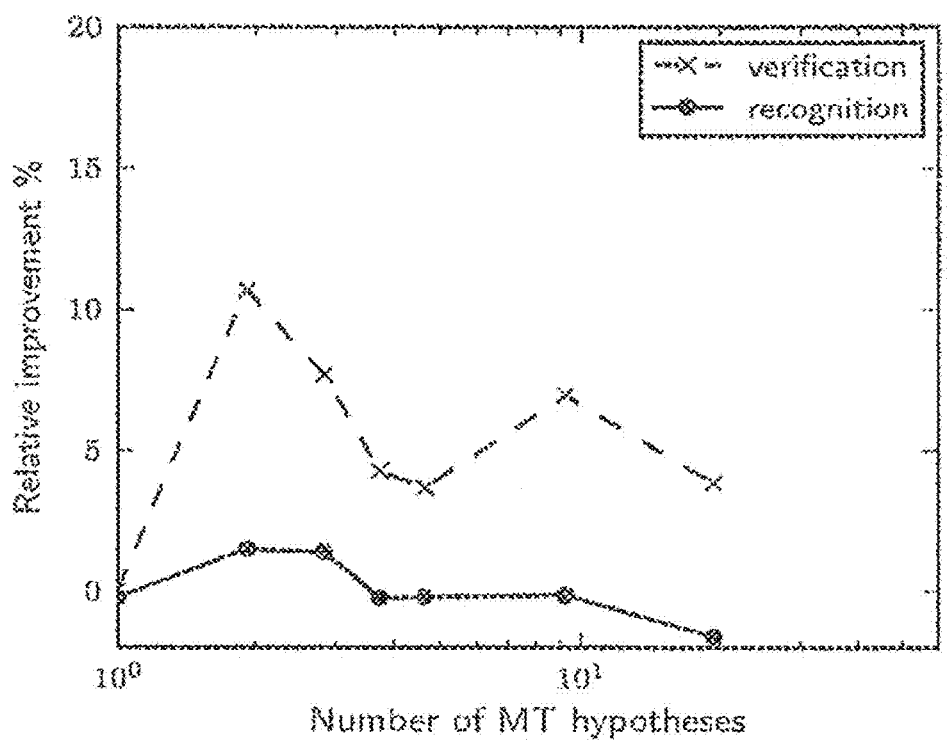

The results for the upper bound closed phrase test set are shown, for example, in FIG. 9. For utterance verification, a relative error rate reduction of 17% was achieved compared to only using the expected phrase; for recognition, the improvement was 8.5%. Testing against the open phrase set is shown, for example, in FIG. 10. The best improvement for utterance verification was 11% compared to the no-error grammar baseline and for the recognition a relative improvement of 1.7%. Thus, a CAPT system such as, the system 100, can increase overall performance of speech recognition compared to known systems.

Figure 11:
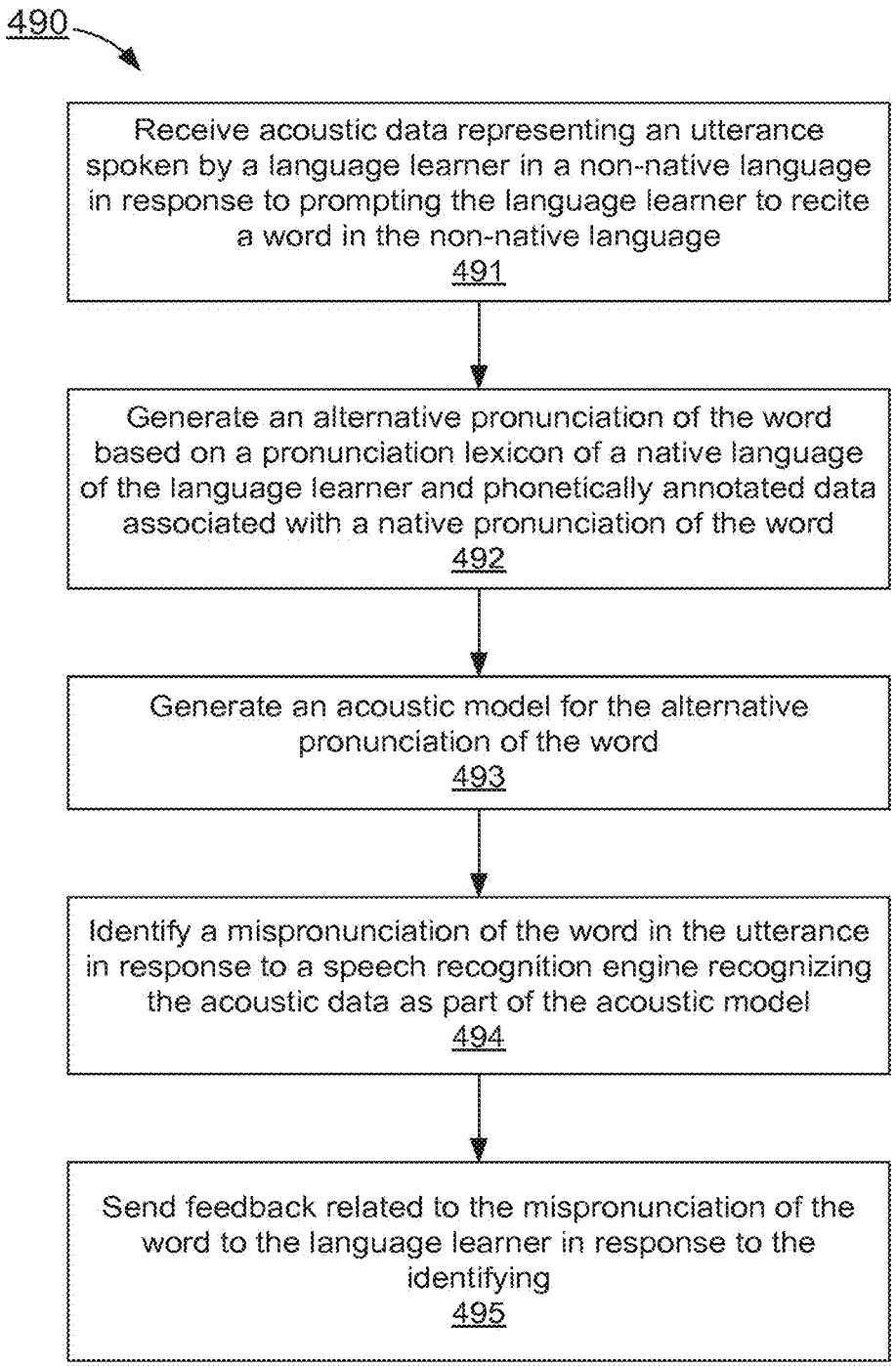
FIG. 11 is a flowchart illustrating a method of using a CAPT system, according to an embodiment.

Referring now to FIG. 11, a flowchart is shown illustrating a method 490 of using a CAPT system, according to an embodiment. In some embodiments, the CAPT system can be substantially similar to or the same as the CAPT system 100 described above with reference to FIGS. 1 and 2. In some embodiments, the CAPT system can include one or more modules or the like such as, for example, the machine translation module, the acoustic model module, and the recognition module described above with reference to FIG. 3, FIGS. 4 and 5, and FIG. 6, respectively. The method 490 includes receiving acoustic data representing an utterance spoken by a language learner in a non-native language in response to prompting the language learner to recite a word in the non-native language, at 491. For example, in some embodiments, the CAPT system can send a visual and/or audio prompt associated with the word to be recited. In some embodiments, the prompt can be a native pronunciation of the word played, for example, by a speaker of a compute device.

The method 490 includes generating an alternative pronunciation of the word based on a pronunciation lexicon of a native language of the language learner and phonetically annotated data associated with a native pronunciation of the word, at 492. For example, in some embodiments, a machine translation engine included in a first hardware and/or software module (e.g., the machine translation module of FIG. 3) can be configured to receive a parallel corpus that can include an utterance in both the native and non-native language and can also include a textual representation of the utterance in both the native and non-native language. The textual representation can be used to define at least a portion of the annotated data associated with the pronunciation of the word. As such, a set of N-best alternative pronunciations are generated that can be, for example, associated with errors in pronunciation that the language learner has a relatively high probability of making.

With the alternative pronunciations defined and/or generated, an acoustic model for the alternative pronunciation of the word is generated, at 493. The acoustic model can be defined and/or generated by, for example, a second hardware and/or software module (e.g., the acoustic model module 250 described above with reference to FIGS. 4 and 5). As such, a second module can be configured to receive information or data from, for example, the first module, associated with the alternative pronunciations and can, in turn, perform and/or execute one or more iterative processes associated with defining the acoustic model for the alternative pronunciations.

A mispronunciation of the word in the utterance is identified in response to a speech recognition engine recognizing the acoustic data as part of the acoustic model, at 494. The speech recognition engine can be, for example, included in a third hardware and/or software module (e.g., the recognition module 280 of FIG. 6). In some embodiments, the speech recognition engine can receive (e.g., as an input into a software module and/or the like) an N-best hypotheses from a first module and an acoustic model from a second module (as shown, for example, in FIG. 6). As such, the speech recognition engine can identify a mispronunciation of a word based on the N-best hypotheses and the acoustic model. In response to the identifying of the mispronunciation of the word, feedback related to the mispronunciation of the word is sent to the language learner, at 495. The feedback can include, for example, an accurate representation of the mispronunciation as well as actionable feedback that can facilitate the learning of the non-native language by the language learner.

FIG. 12 a flowchart illustrating a method 590 of using a CAPT system, according to another embodiment. In some embodiments, the CAPT system can be substantially similar to or the same as the CAPT system 100 described above with reference to FIGS. 1 and 2. In some embodiments, the CAPT system can include one or more modules or the like, such as, for example, the machine translation module, the acoustic model module, and the recognition module described above with reference to FIG. 3, FIGS. 4 and 5, and FIG. 6, respectively. The method 590 includes receiving a phrase having a set of words from a language learning module in response to the language learning module prompting a language learner, having a native language, to recite the phrase in a non-native language, at 591. For example, in some embodiments, the CAPT system can be configured to send a visual and/or audio prompt associated with the word to be recited. In some embodiments, the prompt can be a native pronunciation of the word presented (e.g., played), for example, by a speaker of a compute device. In some embodiments, a machine translation engine included in a first hardware and/or software module (e.g., the machine translation module of FIG. 3) can be configured to receive a parallel corpus that can include the phrase in both the native and non-native language and can also include a textual representation of the phrase in both the native and non-native language. The textual representation can be used to define at least a portion of the annotated data associated with the pronunciation of the word.

The method 590 includes generating a non-native lexicon that includes a set of alternative phrases having a probability greater than a threshold level of being spoken by the language learner when the language learner attempts to recite the phrase in the non-native language, at 592. For example, in some embodiments, a machine translation engine such as, the machine translation engine 247 of FIG. 3, can define a set of N-best alternative pronunciations that can be associated with errors in pronunciation of the phrase that the language learner has a relatively high probability of making. More particularly, in some embodiments, the threshold level and the associated probabilities can be described by, for example, the equations (4)-(6) above.

An acoustic model for each alternative phrase from the set of alternative phrases is generated, at 593. The acoustic model for each alternative phrase from the set of alternative phrases is based, at least partially, on phonetically annotated data associated with a native recitation of each word from the set of words in the phrase. In some embodiments, the acoustic models can be defined and/or generated by, for example, a second hardware and/or software module such as the acoustic model module 250 described above with reference to FIGS. 4 and 5. As such, a second module can be configured to receive information or data from, for example, a first module, associated with the alternative pronunciations and can, in turn, perform and/or execute one or more iterative processes associated with defining the acoustic model for each of the alternative pronunciations.

The method includes identifying that the language learner recited an alternative phrase from the set of alternative phrases based on a comparison of the acoustic model for the alternative phrase and acoustic data representing an utterance spoken by the language learner in response to the language learning module prompting the language learner to recite the phrase in the non-native language, at 594. For example, the acoustic data representing the utterance can be recognized by a speech recognition engine. The speech recognition engine can be, for example, included in a third hardware and/or software module. In some embodiments, the speech recognition engine can receive data associated with N-best hypotheses from, for example, a first module and data associated with an acoustic model from, for example, a second module (as shown, for example, in FIG. 6). In this manner, at least one word from the set of words in the phrase that was incorrectly recited by the language learner is identified to produce the alternate phrase, at 595. Feedback associated with the at least one word is sent to the language learner, at 596. The feedback can include, for example, an accurate representation of the mispronunciation of the word as well as actionable feedback that can facilitate the learning of the non-native language by the language learner.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A non-transitory processor-readable medium storing code representing instructions to be executed by a processor, the code comprising code to cause the processor to:

receive acoustic data representing an utterance spoken by a language learner in a non-native language in response to prompting the language learner to recite a word in the non-native language;

determine a pronunciation lexicon of the word in the non-native language including a set of N-best alternative pronunciations of the word determined based on phonological errors in the non-native language associated with a native language of the language learner using a machine translation engine to generate the set of N-best alternative pronunciations, the phonological errors including at least one of a substitution of an incorrect sound, a deletion of a sound and an insertion of a sound;

generate an acoustic model for the N-best pronunciations of the word from the pronunciation lexicon using the machine translation engine, wherein the acoustic model includes phonetic data associated with the phonological errors of the word in the non-native language;

identify a mispronunciation of the word in the utterance based on a comparison of the acoustic data with the acoustic model of the N-best alternative pronunciations, wherein when a first log likelihood of the acoustic data is greater than a first threshold value and when a difference between the first log likelihood and a second log likelihood of the acoustic model is less than a second threshold value, the acoustic model of the N-best alternative pronunciations is used to identify the mispronunciation of the word in the utterance, and wherein when the difference between the first log likelihood and the second log likelihood of the acoustic model is greater than the second threshold value, the acoustic data is used to identify the mispronunciation of the word in the utterance; and send feedback related to the mispronunciation of the word to the language learner.

2. The non-transitory processor-readable medium of claim 1, wherein the code to cause the processor to identify includes code to cause the processor to identify grammar data associated with the acoustic data that is different from grammar data associated with the acoustic model to produce a grammar inaccuracy, the feedback including the grammar inaccuracy.

3. The non-transitory processor-readable medium of claim 1, wherein the set of N-best alternative pronunciations is determined based on a pronunciation lexicon of the native language and phonetically annotated data related to the native language.

4. The non-transitory processor-readable medium of claim 1, further comprising code to cause the processor to:
generate the pronunciation lexicon of the word in the non-native language based on a pronunciation lexicon of the native language and phonetically annotated data related to the native language.

5. The non-transitory processor-readable medium of claim 1, further comprising code to cause the processor to:
generate a speech model of the word based on the pronunciation lexicon of the word in the non-native language and the acoustic model,
the code to cause the processor to identify including code to cause the processor to identify the mispronunciation of the word in the utterance based on the speech model and the comparison.

6. The non-transitory processor-readable medium of claim 1, wherein the code to cause the processor to generate the acoustic model includes code to cause the processor to:
generate a first lattice for the word in the non-native language; and
generate a second lattice for the N-best alternative pronunciations of the word based on phonetically annotated data associated with the word in the non-native language.

7. The non-transitory processor-readable medium of claim 6, wherein the first lattice and the second lattice are part of a minimum phone error training process used to train the acoustic model.

8. The non-transitory processor-readable medium of claim 1, wherein the pronunciation lexicon of the word in the non-native language is received from a machine translation module.

9. The non-transitory processor-readable medium of claim 1, wherein the utterance is a first utterance, the code further comprising code to cause the processor to:
generate an acoustic model for a second pronunciation of the word;

identify the second pronunciation of the word in a second utterance based on a comparison of acoustic data representing the second utterance with the acoustic model for the second pronunciation of the word; and send feedback related to the second pronunciation of the word to the language learner.

10. The non-transitory processor readable medium of claim 1, wherein the code to cause the processor to determine the pronunciation lexicon includes code to cause the processor to receive the pronunciation lexicon.

11. The non-transitory processor readable medium of claim 1, wherein the phonological error includes at least one of a deletion of a sound and an insertion of a sound.

12. The non-transitory processor-readable medium of claim 1, wherein the phonological error includes one of a possible substitution, a deletion, or an insertion of at least one sound that a language learner that speaks the native language is expected to perform when reciting the word in the non-native language.

13. The non-transitory processor-readable medium of claim 1, wherein the word is from a plurality of words, the acoustic model is generated based on phonetically annotated data associated with a native recitation of each word from the plurality of words.

14. The non-transitory processor-readable medium of claim 1, wherein the code to cause the processor to generate the acoustic model includes code to cause the processor to generate the acoustic model prior to receiving the acoustic data.

15. A method, comprising:
receiving acoustic data representing an utterance spoken by a language learner in a non-native language in response to prompting the language learner to recite a word in the non-native language;
generating a set of N-best alternative pronunciations of the word based on phonological errors in the non-native language associated with a native language of the language learner using a machine translation engine to generate the set of N-best alternative pronunciations, the phonological errors including at least one of a substitution of an incorrect sound, a deletion of a sound and an insertion of a sound;
generating an acoustic model for the set of N-best alternative pronunciations of the word using the machine translation engine, wherein the acoustic model includes phonetic data associated with the phonological errors of the word in the non-native language;
identifying a mispronunciation of the word in the utterance in response to a speech recognition engine recognizing the acoustic data being similar to one of the N-best alternative pronunciations of the word that is included in the acoustic models, wherein when a first log likelihood of the acoustic data is greater than a first threshold value and when a difference between the first log likelihood and a second log likelihood of the acoustic model is less than a second threshold value, the acoustic model of the N-best alternative pronunciations is used to identify the mispronunciation of the word in the utterance, and wherein when the difference between the first log likelihood and the second log likelihood of the acoustic model is greater than the second threshold value, the acoustic data is used to identify the mispronunciation of the word in the utterance; and
sending feedback related to the mispronunciation of the word to the language learner in response to the identifying.

16. The method of claim 15, when the utterance is a first utterance, the method further comprising:
generating an acoustic model for a second pronunciation of the word;
identifying the second pronunciation of the word in a second utterance of the word in response to the speech recognition engine recognizing the acoustic data representing the second utterance as part of the acoustic model for the second pronunciation of the word; and
sending feedback related to the second pronunciation of the word to the language learner in response to the identifying the second pronunciation of the word.

17. The method of claim 15, further comprising:
identifying grammar data associated with the acoustic data that is different from grammar data associated with the acoustic model to produce a grammar inaccuracy, the feedback including the grammar inaccuracy.

18. The method of claim 15, wherein the generating the acoustic model includes:
generating a first lattice for the word in the non-native language; and
generating a second lattice for the N-best alternative pronunciations of the word based on the phonetically annotated data with the native pronunciation of the word.

19. The method of claim 18, wherein the first lattice and the second lattice are part of a minimum phone error training process used to train the acoustic model.

20. The method of claim 15, further comprising:
generating a pronunciation lexicon of the word in the non-native language, the pronunciation lexicon of the word including a set of alternative pronunciations of the word; and
generating a speech model of the word based on the pronunciation lexicon of the word in the non-native language and the acoustic model, the identifying including identifying the mispronunciation of the word in the utterance in response to the speech recognition engine recognizing the acoustic data as part of the acoustic model and the speech model.

21. The method of claim 15, wherein the acoustic model is generated based on phonetically annotated data.

22. A method, comprising:
receiving a phrase having a plurality of words from a language learning module in response to the language learning module prompting a language learner to recite the phrase in a non-native language, the language learner having a native language;
generating a set of N-best alternative phrases based on phonological errors in the non-native language associated with the native language using a machine translation engine, the phonological errors including at least one of a substitution of an incorrect sound, a deletion of a sound and an insertion of a sound;
generating an acoustic model using the machine translation engine for each of the N-best alternative phrases based on phonetically annotated data associated with a native recitation of each word from the plurality of words in the phrase;
identifying that the language learner recited one of the N-best alternative phrases based on a comparison of the acoustic model and acoustic data representing an utterance spoken by the language learner in response to the language learning module prompting the language learner to recite the phrase in the non-native language;
identifying at least one word from the plurality of words in the phrase that was incorrectly recited by the language learner, wherein when a first log likelihood of the at least one word in the phrase recited by the language learner is greater than a first threshold value and when a difference between the first log likelihood and a second log likelihood of the at least one word in the phrase in the acoustic model is less than a second threshold value, the at least one word in the phrase in the acoustic model is used to identify an incorrectly recited word, and wherein when the difference between the first log likelihood and the second log likelihood of the at least one word in the phrase in the acoustic model is greater than the second threshold value, the at least one word in the phase recited by the language learner is used to identify the incorrectly recited word; and
sending feedback to the language learner associated with the at least one word.

23. The method of claim 22, wherein the generating the set of N-best alternative phrases is based on a lexicon of the native language and phonetically annotated data associated with the native recitation of each word from the plurality of words in the phrase.

24. The method of claim 22, wherein the generating the set of N-best alternative phrases is based on a lexicon of the native language and phonetically annotated data associated with a native pronunciation of each word from the plurality of words.

25. The method of claim 22, wherein the alternative phrase from the set of N-best alternative phrases includes at least one grammatical inaccuracy associated with the native recitation of the phrase.

26. The method of claim 22, wherein the generating the acoustic model includes generating a first lattice for each word from the plurality of words in the phrase, and generating a second lattice for each of the set of N-best alternative phrases.

* * * * *